United States Patent
Chen

(10) Patent No.: US 11,924,042 B2
(45) Date of Patent: Mar. 5, 2024

(54) SYSTEM AND METHOD TO REDUCE FLOODING TOPOLOGY SIZE

(71) Applicant: Huawei Technologies Co., Ltd., Shenzhen (CN)

(72) Inventor: Huaimo Chen, Bolton, MA (US)

(73) Assignee: Huawei Technologies Co., Ltd., Shenzhen (CN)

(*) Notice: Subject to any disclaimer, the term of this patent is extended or adjusted under 35 U.S.C. 154(b) by 456 days.

(21) Appl. No.: 17/172,725

(22) Filed: Feb. 10, 2021

(65) Prior Publication Data

US 2021/0168039 A1 Jun. 3, 2021

Related U.S. Application Data

(63) Continuation of application No. PCT/US2019/049372, filed on Sep. 3, 2019.

(60) Provisional application No. 62/733,491, filed on Sep. 19, 2018, provisional application No. 62/725,767, filed on Aug. 31, 2018.

(51) Int. Cl.
*H04L 41/12* (2022.01)
*H04L 41/0659* (2022.01)
*H04L 41/0816* (2022.01)
*H04W 40/24* (2009.01)

(52) U.S. Cl.
CPC .......... *H04L 41/12* (2013.01); *H04L 41/0659* (2013.01); *H04L 41/0816* (2013.01); *H04W 40/246* (2013.01)

(58) Field of Classification Search
None
See application file for complete search history.

(56) References Cited

U.S. PATENT DOCUMENTS

| | | | | |
|---|---|---|---|---|
| 2011/0090787 | A1* | 4/2011 | Smith | H04L 45/32 370/256 |
| 2011/0116366 | A1* | 5/2011 | Smith | H04L 45/03 370/256 |
| 2013/0121156 | A1 | 5/2013 | Rege et al. | |
| 2018/0115481 | A1 | 4/2018 | White et al. | |

(Continued)

FOREIGN PATENT DOCUMENTS

| | | |
|---|---|---|
| CN | 105282041 A | 1/2016 |
| CN | 108463976 A | 8/2018 |

OTHER PUBLICATIONS

International Preliminary Report on Patentability dated Mar. 11, 2021, International Application No. PCT/US2019/049372.

(Continued)

*Primary Examiner* — Clemence S Han
(74) *Attorney, Agent, or Firm* — Vierra Magen Marcus LLP

(57) ABSTRACT

The disclosure relates to path computation and setup of one or more nodes in a network. Connectivity information is received at a local node of the nodes in the network, and a processor of the local node computes a flooding topology based on the received connectivity information, where the flooding topology is represented by links between nodes in the network. The links are encoded between the local node and remote nodes and between remote nodes on the flooding topology, and a link state message is flooded to the remote nodes from the local node in the network, where the link state message includes each of the encoded links in the flooding topology.

21 Claims, 21 Drawing Sheets

(56) References Cited

U.S. PATENT DOCUMENTS

2019/0312805 A1* 10/2019 Li ........................... H04L 45/32
2020/0162335 A1* 5/2020 Chen ....................... H04L 41/22

OTHER PUBLICATIONS

International Search Report and Written Opinion dated Nov. 19, 2019, International Application No. PCT/US2019/049372.
Li et al., "Dynamic Flooding on Dense Graphics; draft-li-dynamic-flooding-05.txt", Jun. 28, 2018, pp. 1-28.
Chen, et al., "ISIS Flooding Reduction; draft-cc-isis-flooding-reduction-01", Apr. 29, 2018, pp. 1-15.
H. Chen et al., "OSPF Flooding Reduction draft-cc-ospf-flooding-reduction-02", Jul. 2, 2018, total:31pages.
Office Action dated Nov. 10, 2023, Chinese Application No. 201980057083.9, pp. 1-7.

* cited by examiner

```
 0                   1
 0 1 2 3 4 5 6 7 8 9 0 1 2 3 4 5 6 7 8 9 0
+-+-+-+-+-+-+-+-+-+-+-+-+-+-+-+-+-+-+-+-+-+
|1 1 1 1|   CNI (15 bits)                 |
+-+-+-+-+-+-+-+-+-+-+-+-+-+-+-+-+-+-+-+-+-+
  ENS        CNI
```

```
 0                   1
 0 1 2 3 4 5 6 7 8 9 0 1 2 3 4 5 6
+-+-+-+-+-+-+-+-+-+-+-+-+-+-+-+-+-+
|1 0 1 0| CNI (10 bits)           |
+-+-+-+-+-+-+-+-+-+-+-+-+-+-+-+-+-+
  ENS        CNI
```

Local Node Encoding (Embodiment 3)

FIG. 4C

```
 0 1 2 3 4 5 6 7 8
+-+-+-+-+-+
|0 0 1 1|   NN (4 bits) indicating three remote nodes
+-+-+-+-+-+-+-+-+-+
|0 0 0 0 0 0 0 1|  CNI=1 for remote node R1 (size of CNI is 8 bits)
+-+-+-+-+-+-+-+-+-+
|0 0 0 0 0 0 1 0|  CNI=2 for remote node R2 (size of CNI is 8 bits)
+-+-+-+-+-+-+-+-+-+
|0 0 0 0 0 0 1 1|  CNI=3 for remote node R3 (size of CNI is 8 bits)
+-+-+-+-+-+-+-+-+-+
```

Remote Node Encoding (Embodiment 1)

*FIG. 5A*

```
 0 1 2 3 4 5 6 7 8
+-+-+-+-+-+
|0 0 1 1|       NN = 3 (4 bits) indicating three remote nodes
+-+-+-+-+-+
|0 0 0|         ENS (3 bits) indicating size of CNI for remote nodes is 7 bits
+-+-+-+-+-+-+-+-+
|0 0 0 0 0 0 1| CNI=1 for R1 (size of CNI is 7 bits)
+-+-+-+-+-+-+-+-+
|0 0 0 0 0 1 0| CNI=2 for R2 (size of CNI is 7 bits)
+-+-+-+-+-+-+-+-+
|0 0 0 0 0 1 1| CNI=3 for R3 (size of CNI is 7 bits)
+-+-+-+-+-+-+-+-+
```

Remote Node Encoding (Embodiment 2)

*FIG. 5B*

```
 0 1 2 3 4 5 6 7 8
+-+-+-+-+-+-+-+-+-+
|0 0 1|              ENS (3 bits) indicating size of CNI for local node is 8 bits
+-+-+-+-+-+-+-+-+-+
|0 0 0 0 0 0 0 0|    CNI=0 for local node L1 (size of CNI for L1 is 8 bits)
+-+-+-+-+-+-+-+-+-+
|0 0 1 1|            NN (4 bits) indicating three remote nodes
+-+-+-+-+
|0 0 0 0 0 0 0 1|    CNI=1 for remote node R1 (size of CNI for R1 is 8 bits)
+-+-+-+-+-+-+-+-+-+
|0 0 0 0 0 0 1 0|    CNI=2 for remote node R2 (size of CNI for R2 is 8 bits)
+-+-+-+-+-+-+-+-+-+
|0 0 0 0 0 0 1 1|    CNI=3 for remote node R3 (size of CNI for R3 is 8 bits)
+-+-+-+-+-+-+-+-+-+
```

Links Encoding (Embodiment 1)

*FIG. 6A*

```
 0 1 2 3 4 5 6 7 8
+-+-+-+-+-+-+-+-+-+
|0 1 0|            ENS (3 bits) indicating size of CNI for local node is 8 bits
+-+-+-+-+-+-+-+-+-+
|0 0 0 0 0 0 0 0|  CNI=0 for local node L1 (size of CNI for L1 is 8 bits)
+-+-+-+-+-+-+-+-+-+
|0 0 1 1|          NN (4 bits) indicating three remote nodes
+-+-+-+-+
|0 0 0|            ENS (3 bits) indicating size of CNI for remote node is 6 bits
+-+-+-+-+-+-+
|0 0 0 0 0 1|      CNI=1 for remote node R1 (size of CNI for R1 is 6 bits)
+-+-+-+-+-+-+
|0 0 0 0 1 0|      CNI=2 for remote node R2 (size of CNI for R2 is 6 bits)
+-+-+-+-+-+-+
|0 0 0 0 1 1|      CNI=3 for remote node R3 (size of CNI for R3 is 6 bits)
+-+-+-+-+-+-+
```

Links Encoding (Embodiment 2)

*FIG. 6B*

```
 0 1 2 3 4 5 6 7
+-+-+-+-+-+-+-+-+
|0 0 1 0|          ENS (4 bits) indicating size of CNI for local node is 2 bits
+-+-+-+-+
|0 0|              CNI=0 for local node L1 (size of CNI for L1 is 2 bits)
+-+-+-+-+
|0 0 1 1|          NN (4 bits) indicating three remote nodes
+-+-+-+-+
|0 1|              CNI=1 for remote node R1 (size of CNI for R1 is 2 bits)
+-+-+
|1 0|              CNI=2 for remote node R2 (size of CNI for R2 is 2 bits)
+-+-+
|1 1|              CNI=3 for remote node R3 (size of CNI for R3 is 2 bits)
+-+-+
```

Links Encoding (Embodiment 3)

*FIG. 6C*

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       FT-TLV-Type (TBD2)      |          TLV-Length           |
+-+-+-+-+-+-+-+-+-+-+-+-+-+-+-+-+-+-+-+-+-+-+-+-+-+-+-+-+-+-+-+-+
~           Links Encoding (Node 1 to its Remote Nodes)         ~
+-+-+-+-+-+-+-+-+-+-+-+-+-+-+-+-+-+-+-+-+-+-+-+-+-+-+-+-+-+-+-+-+
~           Links Encoding (Node 2 to its Remote Nodes)         ~
+-+-+-+-+-+-+-+-+-+-+-+-+-+-+-+-+-+-+-+-+-+-+-+-+-+-+-+-+-+-+-+-+
~                                                               ~
~                                                               ~
+-+-+-+-+-+-+-+-+-+-+-+-+-+-+-+-+-+-+-+-+-+-+-+-+-+-+-+-+-+-+-+-+
~           Links Encoding (Node N to its Remote Nodes)         ~
+-+-+-+-+-+-+-+-+-+-+-+-+-+-+-+-+-+-+-+-+-+-+-+-+-+-+-+-+-+-+-+-+

Flooding Topology TLV
```

FIG. 7A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        LS age                 |  Options      | LS Type = 10  |
+-+-+-+-+-+-+-+-+-+-+-+-+-+-+-+-+-+-+-+-+-+-+-+-+-+-+-+-+-+-+-+-+
| FT Type(TBD6) |              Instance ID                      |
+-+-+-+-+-+-+-+-+-+-+-+-+-+-+-+-+-+-+-+-+-+-+-+-+-+-+-+-+-+-+-+-+
|                     Advertising Router                        |
+-+-+-+-+-+-+-+-+-+-+-+-+-+-+-+-+-+-+-+-+-+-+-+-+-+-+-+-+-+-+-+-+
|                     LS Sequence Number                        |
+-+-+-+-+-+-+-+-+-+-+-+-+-+-+-+-+-+-+-+-+-+-+-+-+-+-+-+-+-+-+-+-+
|         LS checksum           |             Length            |
+-+-+-+-+-+-+-+-+-+-+-+-+-+-+-+-+-+-+-+-+-+-+-+-+-+-+-+-+-+-+-+-+
|                                                               |
~                  Flooding Topology Links TLV                  ~
+-+-+-+-+-+-+-+-+-+-+-+-+-+-+-+-+-+-+-+-+-+-+-+-+-+-+-+-+-+-+-+-+

OSPFv2: Flooding Topology Opaque LSA
```

FIG. 7B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       CL-TLV-Type (TBD3)      |           TLV-Length           |
+-+-+-+-+-+-+-+-+-+-+-+-+-+-+-+-+-+-+-+-+-+-+-+-+-+-+-+-+-+-+-+-+
~      Critical Links Encoding (Node 1 to some Remote Nodes     ~
+-+-+-+-+-+-+-+-+-+-+-+-+-+-+-+-+-+-+-+-+-+-+-+-+-+-+-+-+-+-+-+-+
~      Critical Links Encoding (Node 2 to some Remote Nodes     ~
+-+-+-+-+-+-+-+-+-+-+-+-+-+-+-+-+-+-+-+-+-+-+-+-+-+-+-+-+-+-+-+-+
~                                                               ~
~                                                               ~
+-+-+-+-+-+-+-+-+-+-+-+-+-+-+-+-+-+-+-+-+-+-+-+-+-+-+-+-+-+-+-+-+
~      Critical Links Encoding (Node M to some Remote Nodes     ~
+-+-+-+-+-+-+-+-+-+-+-+-+-+-+-+-+-+-+-+-+-+-+-+-+-+-+-+-+-+-+-+-+

Critical Links TLV
```

FIG. 8A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       BL-TLV-Type (TBD4)      |           TLV-Length           |
+-+-+-+-+-+-+-+-+-+-+-+-+-+-+-+-+-+-+-+-+-+-+-+-+-+-+-+-+-+-+-+-+
~       Backup Links Encoding (Node 1 to some Remote Nodes      ~
+-+-+-+-+-+-+-+-+-+-+-+-+-+-+-+-+-+-+-+-+-+-+-+-+-+-+-+-+-+-+-+-+
~       Backup Links Encoding (Node 2 to some Remote Nodes      ~
+-+-+-+-+-+-+-+-+-+-+-+-+-+-+-+-+-+-+-+-+-+-+-+-+-+-+-+-+-+-+-+-+
~                                                               ~
~                                                               ~
+-+-+-+-+-+-+-+-+-+-+-+-+-+-+-+-+-+-+-+-+-+-+-+-+-+-+-+-+-+-+-+-+
~       Backup Links Encoding (Node M to some Remote Nodes      ~
+-+-+-+-+-+-+-+-+-+-+-+-+-+-+-+-+-+-+-+-+-+-+-+-+-+-+-+-+-+-+-+-+

Backup Links TLV
```

FIG. 8B

```
         0 1 2 3 4 5 6 7 8
        +-+-+-+-+-+-+-+-+-+
        |0 0 0|             ENS (3 bits) [9 bits CNI]   |
        +-+-+-+-+-+-+-+-+-+                             } Encoding for
        | L1 Index Value  | CNI   (9 bits)             _| Local Node L1
        +-+-+-+-+-+-+-+-+-+                             ‾
        |0 1 1|             NN(3 bits)[3 remote nodes]  |
        +-+-+-+                                         |
        |1 1 1|             E Flags [NN=3 bits]         | Encoding for
        +-+-+-+-+-+-+-+-+-+                             | 3 remote nodes
        |    R1's Index   | CNI (9 bits) for R1         } (R1, R2, R3)
        +-+-+-+-+-+-+-+-+-+                             | of L1
        |    R2's Index   | CNI (9 bits) for R2         |
        +-+-+-+-+-+-+-+-+-+                             |
        |    R3's Index   | CNI (9 bits) for R3        _|
        +-+-+-+-+-+-+-+-+-+                             ‾
        |0 0 1|             NN (3 bits)[1 remote node]  |
        +-+-+-+                                         | Encoding for
        |1|                 E Flags [NN=1 bit]          } 1 remote node
        +-+-+-+-+-+-+-+-+-+                             | (R11)
        |   R11's Index   | CNI (9 bits) for R11       _| of R1
        +-+-+-+-+-+-+-+-+-+                             ‾
        |0 1 0|             NN (3 bits)[2 remote nodes] |
        +-+-+-+                                         |
        |0 0|               E Flags [NN=2 bits]         | Encoding for
        +-+-+-+-+-+-+-+-+-+                             } 2 remote nodes
        |   R21's Index   | CNI (9 bits) for R21        | (R21, R22)
        +-+-+-+-+-+-+-+-+-+                             | of R2 as a
        |   R22's Index   | CNI (9 bits) for R22       _| local node
        +-+-+-+-+-+-+-+-+-+                             ‾
        |0 1 1|             NN(3 bits)[3 remote nodes]  |
        +-+-+-+                                         |
        |0 0 0|             E Flags [NN=3 bits]         | Encoding for
        +-+-+-+-+-+-+-+-+-+                             | 3 remote nodes
        |   R22's Index   | CNI (9 bits) for R22        }(R22, R31, R32)
        +-+-+-+-+-+-+-+-+-+                             | of R3
        |   R31's Index   | CNI (9 bits) for R31        |
        +-+-+-+-+-+-+-+-+-+                             |
        |   R32's Index   | CNI (9 bits) for R32       _|
        +-+-+-+-+-+-+-+-+-+                             ‾
        |0 1 1|             NN (3 bits)[3 remote nodes] |
        +-+-+-+                                         |
        |0 0 0|             E Flags [NN=3 bits]         | Encoding for
        +-+-+-+-+-+-+-+-+-+                             | 3 remote nodes
        |   R32's Index   | CNI (9 bits) for R32        }(R32,R111, R21)
        +-+-+-+-+-+-+-+-+-+                             | of R11
        |  R111's Index   | CNI (9 bits) for R111       |
        +-+-+-+-+-+-+-+-+-+                             |
        |   R21's Index   | CNI (9 bits) for R21       _|
        +-+-+-+-+-+-+-+-+-+
                     Block Links Encoding
```

*FIG. 9C*

```
 0 1 2 3 4 5 6 7 8
+-+-+-+-+-+-+-+-+-+
|0 0 0|             ENS (3 bits) [9 bits CNI]     |
+-+-+-+-+-+-+-+-+-+                               } Encoding for
| L1 Index Value |  CNI   (9 bits)                _| Local Node L1
+-+-+-+-+-+-+-+-+-+
|0 1 1|             NN(3 bits)[3 remote nodes]    |
+-+-+-+                                           |
|1 1 1|             E Flags [NN=3 bits]           | 1.Encoding for
+-+-+-+-+-+-+-+-+-+                               | 3 remote nodes
| R1's Index     |  CNI (9 bits) for R1           } (R1, R2, R3)
+-+-+-+-+-+-+-+-+-+                               | of L1
| R2's Index     |  CNI (9 bits) for R2           |
+-+-+-+-+-+-+-+-+-+                               |
| R3's Index     |  CNI (9 bits) for R3           _|
+-+-+-+-+-+-+-+-+-+
|0 0 1|             NN (3 bits)[1 remote node]    |
+-+-+-+                                           | 2.Encoding for
|1|                 E Flags [NN=1 bit]            } 1 remote node
+-+-+-+-+-+-+-+-+-+                               | (R11)
| R11's Index    |  CNI (9 bits) for R11          _| of R1
+-+-+-+-+-+-+-+-+-+
|0 1 1|             NN (3 bits)[3 remote nodes]   |
+-+-+-+                                           |
|1 0 0|             E Flags [NN=3 bits]           | 3.Encoding for
+-+-+-+-+-+-+-+-+-+                               | 3 remote nodes
| R32's Index    |  CNI (9 bits) for R32          }(R32,R111, R21)
+-+-+-+-+-+-+-+-+-+                               | of R11
| R111's Index   |  CNI (9 bits) for R111         |
+-+-+-+-+-+-+-+-+-+                               |
| R21's Index    |  CNI (9 bits) for R21          _|
+-+-+-+-+-+-+-+-+-+
|0 0 1|             NN (3 bits)[1 remote node]    |
+-+-+-+                                           | 4.Encoding for
|1|                 E Flags [NN=1 bit]            } 1 remote node
+-+-+-+-+-+-+-+-+-+                               | (R3)
| R3's Index     |  CNI (9 bits) for R11          _| of R32
+-+-+-+-+-+-+-+-+-+

+-+-+-+-+-+-+-+-+-+
|0 1 0|             NN(3 bits)[2 remote nodes]    |
+-+-+-+                                           |
|1 0|               E Flags [NN=2 bits]           | 5.Encoding for
+-+-+-+-+-+-+-+-+-+                               | 2 remote nodes
| R22's Index    |  CNI (9 bits) for R22          } (R22, R31)
+-+-+-+-+-+-+-+-+-+                               | of R3
| R31's Index    |  CNI (9 bits) for R31          _|
+-+-+-+-+-+-+-+-+-+
|0 0 1|             NN (3 bits)[1 remote node]    |
+-+-+-+                                           | 6.Encoding for
|1|                 E Flags [NN=1 bit]            } 1 remote node
+-+-+-+-+-+-+-+-+-+                               | (R2)
| R2's Index     |  CNI (9 bits) for R2           _| of R22
+-+-+-+-+-+-+-+-+-+
|0 0 1|             NN (3 bits)[1 remote node]    |
+-+-+-+                                           | 7.Encoding for
|0|                 E Flags [NN=1 bits]           } 1 remote node
+-+-+-+-+-+-+-+-+-+                               | (R21)
| R21's Index    |  CNI (9 bits) for R21          _| of R2
+-+-+-+-+-+-+-+-+-+

Block Links Encoding in Depth-first
```

*FIG. 9D*

SYSTEM AND METHOD TO REDUCE FLOODING TOPOLOGY SIZE

CLAIM FOR PRIORITY

This application is a Continuation of and claims the benefit of priority to International Patent Application No. PCT/US2019/049372, filed Sep. 3, 2019, which claims the benefit of priority to U.S. Provisional Patent Application No. 62/725,767, filed Aug. 31, 2018, and U.S. Provisional Patent Application No. 62/733,491, filed Sep. 19, 2018, the entire contents of which are hereby incorporated by reference.

FIELD

The disclosure relates to network communication, and in particular to distribution of flooding network topologies.

BACKGROUND

A wide variety of devices connect to service provider networks to access resources and services provided by packet-based data networks, such as the Internet, enterprise intranets, content providers and virtual private networks (VPNs). For example, many fixed computers utilize fixed communication links, such as optical, digital subscriber line, or cable-based connections, of service provider networks to access the packet-based services. In addition, a vast amount of mobile devices, such as cellular or mobile smart phones and feature phones, tablet computers, and laptop computers, utilize mobile connections, such as cellular radio access networks of the service provider networks, to access the packet-based services. When employing a centralized mode for interior gateway protocol (IGP) flooding reduction, the size of the flooding topology is very large. The topology is flooded to every node of the network, which results in the current representation of the flooding topology not being efficient. In addition, critical failures and links on the flooding topology are not represented.

BRIEF SUMMARY

According to one aspect of the present disclosure, there is provided a network with one or more nodes, comprising a first node including a processor, a receiver and a transmitter to: receive connectivity information of one or more nodes in the network including the first node; compute a flooding topology based on the received connectivity information, the flooding topology represented by links between the one or more nodes, including the first node, in the network; encode the links between the one or more nodes, including the first node, on the flooding topology; and flooding a link state message to the one or more nodes in the network, the link state advertisement message including each of the encoded links in the flooding topology; and a second node including a processor, a receiver and a transmitter to: receive the link state message including the encoded links in the flooding topology; and decode the encoded links in the link state message to obtain the flooding topology.

According to another aspect of the presented disclosure, there is provided a computer implemented method for path computation and setup of one or more nodes in a network, comprising receiving, at a receiver of a first node, connectivity information of one or more nodes in the network including the first node; computing, by a processor of the first node, a flooding topology based on the received connectivity information, the flooding topology represented by links between the one or more nodes, including the first node, in the network; encoding the links, by the processor at the first node, between the one or more nodes, including the first node, on the flooding topology; and flooding, by a transmitter of the first node, a link state message to the one or more nodes in the network, the link state advertisement message including each of the encoded links in the flooding topology.

Optionally, in any of the preceding aspects, the one or more nodes in the network is represented by a router information link state advertisement message that includes a type-length-value with a sequence of router identifiers that represents an index for each of the one or more nodes.

Optionally, in any of the preceding aspects, the first node is encoded with an encoded node index size (ENS) index and a compact node index (CNI), where the ENS includes one or more values indicating a size of the CNI.

Optionally, in any of the preceding aspects, a second node of the one or more nodes in the network is encoded with a number of nodes (NN), the ENS and the CNI, where the NN indicates a number of nodes of the size of the CNI.

Optionally, in any of the preceding aspects, the links between the first node and the one or more nodes in the network are encoded as a sequence of nodes beginning with the first node followed by each of the one or more nodes connected by the links to the first node.

Optionally, in any of the preceding aspects, the computer-implemented method further comprising computing a critical node in the flooding topology, where failure of the critical node results in the flooding topology being split; determining one or more critical links in the flooding topology between the critical node and the one or more nodes in the network, where failure of the one or more critical links results in the flooding topology being split; and encoding the one or more critical links in the flooding topology between the critical node and the one or more nodes in the network as a sequence of nodes beginning with the critical node followed by each of the one or more nodes connected by the one or more critical links to the critical node.

Optionally, in any of the preceding aspects, the computer-implemented method further comprising computing an alternative connection between two end nodes of the one or more nodes of the link on the flooding topology or a path crossing one of the one or more nodes on the flooding topology; and distributing a second link state advertisement message, including the alternative connection, to the two end nodes to connect the split flooding topology when the one or more critical links fail; and distributing the second link state advertisement message, including the path crossing the one of the one or more nodes, to connect the split flooding topology when the critical node fails.

According to still one other aspect of the disclosure, there is a non-transitory computer-readable medium storing computer instructions for path computation and setup, that when executed by one or more processors, cause the one or more processors to perform the steps of receiving, at a receiver of a first node, connectivity information of one or more nodes in the network including the first node; computing, by a processor of the first node, a flooding topology based on the received connectivity information, the flooding topology represented by links between the one or more nodes, including the first node, in the network; encoding the links, by the processor at the first node, between the one or more nodes, including the first node, on the flooding topology; and flooding, by a transmitter of the first node, a link state message to the one or more nodes in the network, the link state advertisement message including each of the encoded links in the flooding topology.

According to yet another aspect of the disclosure, there is provided a device for path computation and setup in a network, comprising a non-transitory memory storage comprising instructions; and one or more processors in communication with the memory, wherein the one or more processors execute the instructions to: receive connectivity information of one or more nodes in the network including the first node; compute a flooding topology based on the received connectivity information, the flooding topology represented by links between the one or more nodes, including the first node, in the network; encode the links between the one or more nodes, including the first node, on the flooding topology; and flood a link state message to the one or more nodes in the network, the link state advertisement message including each of the encoded links in the flooding topology.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 4A-4C illustrate example embodiments of local node encoding in a network.

FIGS. 5A and 5B illustrate example embodiments of remote node encoding in a network.

FIGS. 6A-6C illustrate example embodiments of a link encoding in a network.

FIGS. 7A-7C illustrates and example flooding topology type-length-value (TLV) packet.

FIGS. 8A-8B illustrate an example critical links and backup links TLV packet.

FIGS. 9A-9D illustrate example embodiments of block links encoding.

DETAILED DESCRIPTION

Figure 1:
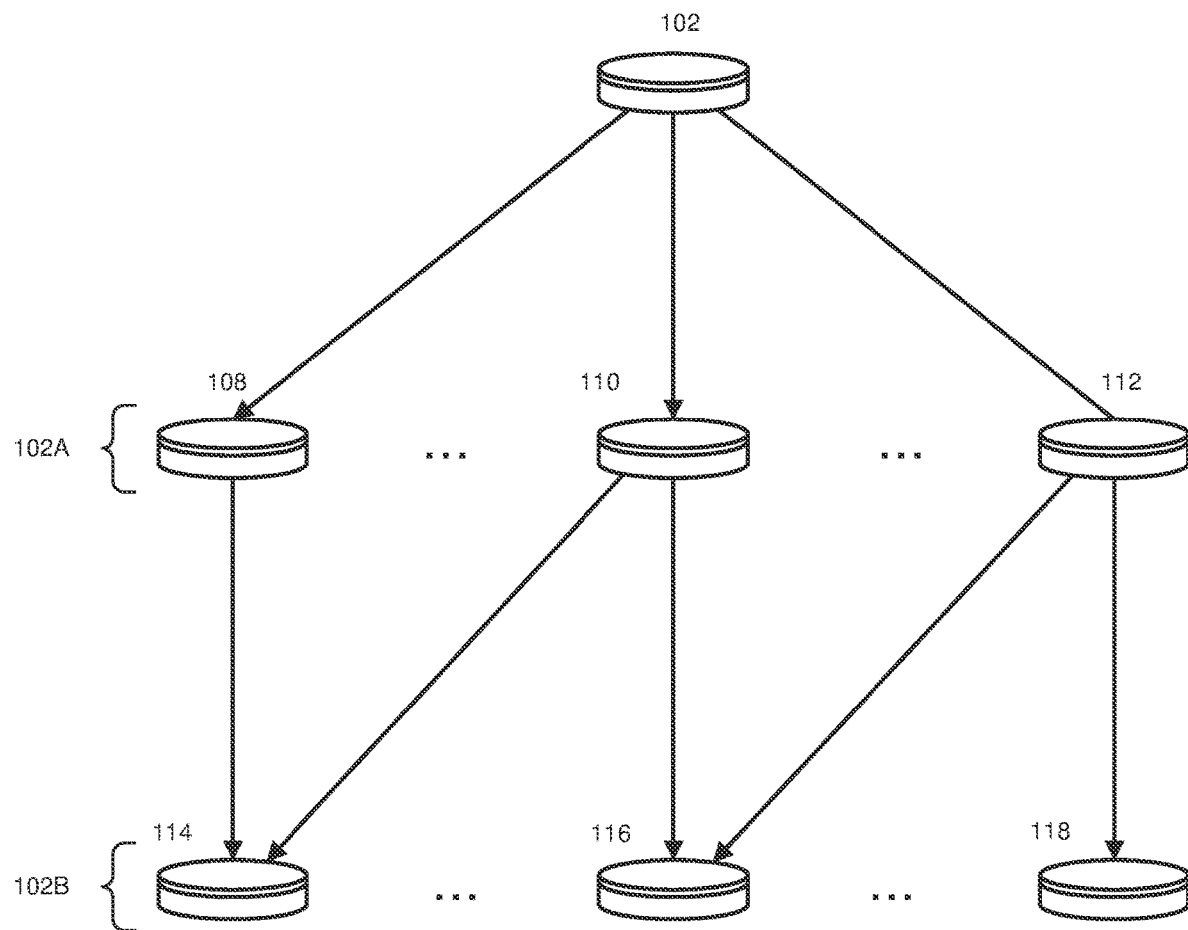
FIG. 1 shows an example of flooding a network topology.

The present disclosure will now be described with reference to the figures, which in general relate to a driver attention detection.

The technology relates to distribution of flooding network topologies to reduce signaling overhead related to link state advertisements (messages) in IGP networks, such as open shortest path first (OSPF) or intermediate system (IS) to IS (IS-IS) networks.

Communicating link state messages from a node to all other nodes in a network domain is referred to as flooding. The disclosed mechanisms reduce the impact of link state advertisement/message flooding by generating a flooding topology that is a subset of the real network topology. In general, each node floods the network by transmitting link state messages over the flooding topology without transmitting such messages across network links that are excluded from the flooding topology. This allows the message to reach all other nodes in the network, while minimizing the number of redundant copies of the message received at each node. For example, the flooding topology may be generated as a tree of links (e.g., a spanning tree) that connects the nodes. Such a tree of links allows a link state message to be flooded to all nodes while ensuring each node receives a single copy of the flooded message.

For increased reliability, an alternate message path (s) is provided across the flooding topology in the event a link or node malfunctions/fails. Additionally, when a link or node fails, a node adjacent to the malfunction can communicate link state messages to other nodes that are adjacent to the failure. The nodes may also retain knowledge of critical elements. A critical element is a flooding topology link/interface or node that, upon failure, splits the flooding topology into two or more parts. Upon notification of the failure of a critical element, the nodes may revert to flooding link state messages over all links in order to maintain network functionality until the link/node is repaired or until a new flooding topology can be computed that does not include the failed element.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

As more and more nodes (e.g., routers) are added into a conventional communications network, the size of the network increases, and issues such as scalability and slow convergence may arise. In communication networks such as the Internet, an autonomous system (AS) may have a common routing policy (either in a single network or in a group of networks) that is controlled by a network administrator (or group of administrators on behalf of a single administrative entity, such as a university, a business enterprise, or a business division). Within the Internet, an AS comprises a collection of routers exchanging routing information via a common routing protocol. Each AS on the Internet may be assigned a globally unique number, which is sometimes called an AS number (ASN).

In a network comprising a single autonomous system (AS) with a single area, each node needs to be aware of the positional relationships (i.e., adjacencies) of all other nodes, such that all nodes may build a topological map (topology)

of the AS. Nodes may learn about one another's adjacencies by distributing (i.e., flooding) link-state information throughout the network according to one or more IGPs including, but not limited to, open shortest path first (OSPF) or intermediate system (IS) to IS (IS-IS). Specifically, nodes engaging in IGPs may distribute their own link state advertisements (LSAs) describing their own adjacencies to all their neighboring nodes, which may forward the received LSAs to all their neighboring nodes (except the node from which the LSA was received). This may allow the LSA to be distributed throughout the network such that all network nodes become aware of one another's adjacencies, thereby allowing the various nodes to build topology graphs (e.g., link state databases (LSDBs)). LSAs may be distributed upon network initialization as well as whenever a network adjacency changes (e.g., a node is added/removed or a node/link fails). A network change may lead to every node in the network having to re-compute a shortest path to each destination, and to update its routing information base (RIB) and its forwarding information base (FIB). Consequently, as more nodes are added to a network, link state distributions and shortest path computations may begin to consume more and more network resources, such as bandwidth and/or processing time.

Through splitting a network into multiple areas, the network may be further extended. However, there are a number of issues when splitting a network into multiple areas. For example, dividing an AS into multiple ASs or an area into multiple areas may involve significant network architecture changes. For another example, it may be complex to setup a multi-protocol label switching (MPLS) traffic engineering (TE) label switching path (LSP) crossing multiple areas. In general, a TE path crossing multiple areas may be computed by using collaborating path computation elements (PCEs) through the PCE communication protocol (PCEP), which may not be easy to configure by operators since manual configuration of the sequence of domains is required. Further, the current PCE method may not guarantee that the path found would be optimal. For yet another example, some policies may need to be reconfigured on ABRs for reducing the number of link states such as summary link-state advertisements (LSAs) to be distributed to other routers in other areas. Thus, as an AS grows larger (e.g., comprising more and more nodes), scalability issues may arise, which may result from, for example, the inability of a large network to quickly compute a shortest path to every destination on each node, and efficiently manage or distribute network topology information. Consequently, larger networks may suffer from slower convergence. For example, larger networks may require a longer period to build or update topology graphs, during which time data may be misdirected or lost. Moreover, re-convergence in large networks may also be an issue, as the inability to timely recover from a fault in a node/link (or some other condition that changes a network adjacency subsequent to initialization) may disrupt network services, such as the traffic transported from node to node along the shortest path.

There are some encodings for flooding topology in a centralized mode flooding reduction. One uses a path to represent a piece of flooding topology. Another represents the links between a local node and its remote nodes. However, these representations of flooding topology are not efficient. The present disclosure proposes a more efficient representation of flooding topology, which greatly reduces the size of the flooding topology to be flooded to every node.

The disclosed embodiments provide transmission of link state messages in a network that reduce flooding of link state changes in a network. FIG. 1 shows an example of flooding a network topology. The network may include a flooding node 102 that performs flooding of link state messages to nodes 108-112 in a set of neighbors 102A that are directly connected to the flooding node 102. Some or all of the neighbors may operate as subsequent flooding nodes by re-flooding the link state messages to nodes 114-118 in a set of neighbor's neighbors 102B (i.e., two-hop neighbors of the flooding node).

Flooding node 102 and nodes 108-118 may be routers and/or other types of switching nodes in a packet-switched network. As a result, link state messages transmitted from the flooding node to neighbors 102A, and subsequently to two-hop neighbors 102B, may be used by the switching nodes to update their routing tables based on changes in connectivity within the network. For example, a change in the reachability of a node, destination, and/or link in the network may be detected by the flooding node 102. The flooding node 102 may use a link state protocol such as Open Shortest Path First (OSPF) and/or Intermediate System to Intermediate System (IS-IS) to flood a link state message containing the change in reachability to neighbors 102A. As each neighbor 102A receives the link state message, the neighbor may operate as the flooding node and flood the link state message to the neighbor's neighbors 102B (i.e., two-hop neighbors of the flooding node), with the exception of the node from which the link state message was received. Flooding of the link state message may thus be used to propagate the link state message across the network. After the link state message is received at a node, the node may recalculate paths in one or more routing tables based on the change in reachability communicated in the link state message.

The following documents are incorporated herein by reference as if reproduced in their entirety: Internet Engineering Task Force (IETF) document entitled "LS Flooding Reduction" (draft-cc-ospf-flooding-reduction-04) by H. Chen, published Sep. 17, 2018, which is incorporated herein by reference.

Figure 2:
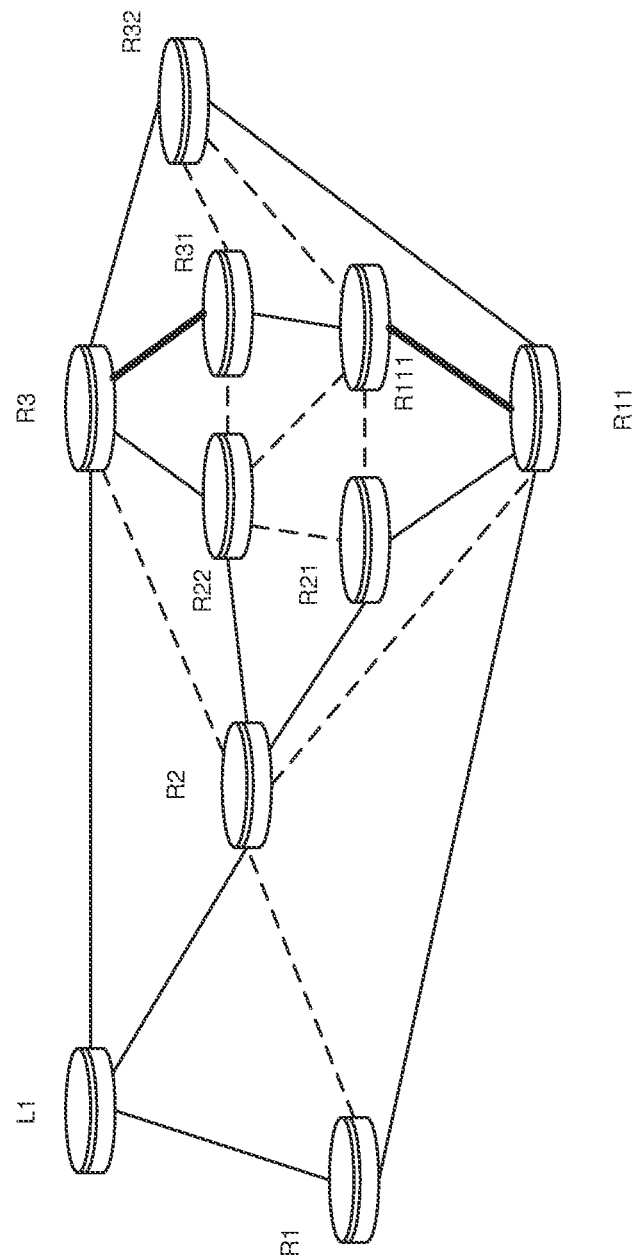
FIG. 2 illustrates an example embodiment of an open shortest path first (OSPF) network topology.

FIG. 2 illustrates an example embodiment of an OSPF network topology. In the network topology, links between nodes are represented by lines (including dashed and darkened lines) which have been created as a result of flooding the network. Many different flooding topologies can be constructed for a network topology. A chain connecting all the nodes in the given network topology is a flooding topology. A circle connecting all the nodes is another type flooding topology. A tree connecting all the nodes is also a flooding topology. In addition, the tree plus the connections between some leaves of the tree and branch nodes of the tree is a flooding topology. For an OSPF network topology, a flooding topology is defined as a sub-graph or sub-network of the network topology that has the same reachability to every node as the network topology.

When constructing a flooding topology, such as the one depicted in FIG. 2, the following parameters should be considered: (1) Number of links: The number of links on the flooding topology is a key factor for reducing the amount of LS flooding. In general, the smaller the number of links, the less the amount of LS flooding; (2) Diameter: The shortest distance between the two most distant nodes on the flooding topology (i.e., the diameter of the flooding topology) is a key factor for reducing the network convergence time. The smaller the diameter, the less the convergence time; and (3) Redundancy: The redundancy of the flooding topology means a tolerance to the failures of some links and nodes on the flooding topology. If the flooding topology is split by some failures, it is not tolerant to these failures. In general, the larger the number of links on the flooding topology is, the more tolerant the flooding topology to failures.

Figure 12:
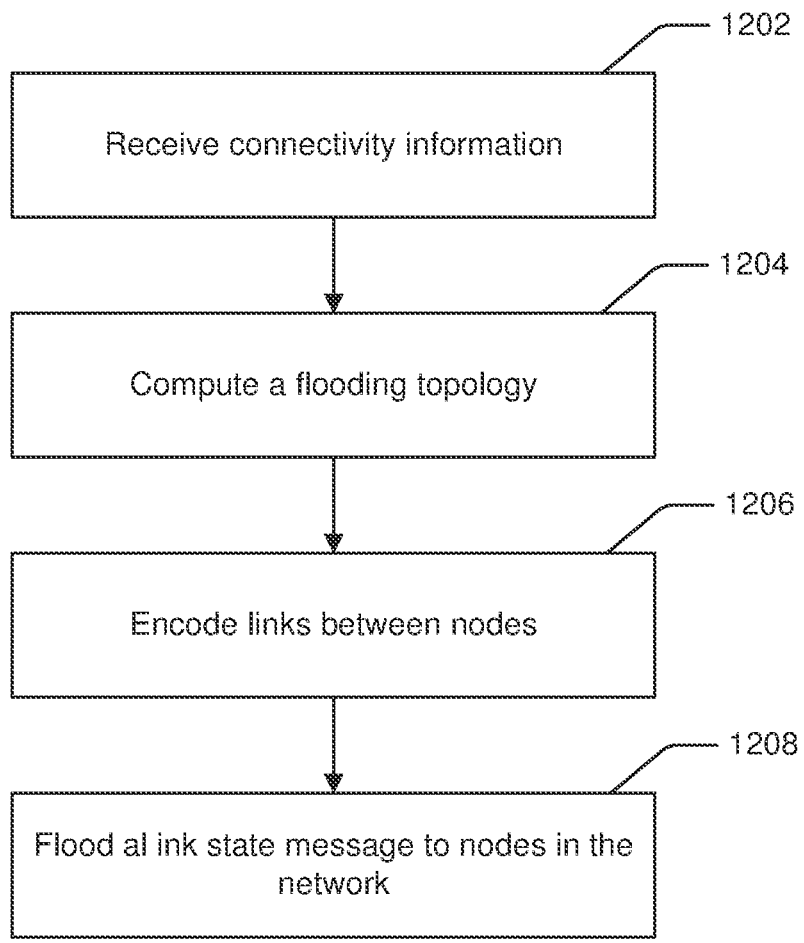
FIG. 12 illustrates an example flow diagram for computing a path in a network.

Similarly, there are many different ways to construct a flooding topology for a given network topology, including but not limited to: (1) Centralized Mode: One node in the network builds a flooding topology and floods the flooding topology to all the other nodes in the network (Note: Flooding the flooding topology may increase the flooding. The amount of traffic for flooding the flooding topology should be minimized); (2) Distributed Mode: Each node in the network automatically calculates a flooding topology by using the same algorithm (No flooding for flooding topology); and (3) Static Mode: Links on the flooding topology are configured statically. Note that the flooding topology constructed by a node is dynamic in nature, such that when the base topology (the entire topology graph) changes, the flooding topology (the sub-graph) is re-computed/re-constructed to ensure that any node that is reachable on the base topology is also be reachable on the flooding topology. An example of a flooding reduction instruction is shown in FIG. 12.

As an example in the depicted embodiment, the flooding topology is represented by twelve links in a single structure. In particular, the links on the flooding topology are shown between nodes L1 and R1; L1 and R2; L1 and R3; R1 and R11; R2 and R21; R2 and R22; R3 and R22; R3 and R31; R3 and R32; R11 and R32; R11 and R111; and R11 and R21, where L is defined as a local node and R is defined as a remote node. For the links between a local node (L) and multiple remote nodes (R), e.g., the three links between local node L1 and remote nodes R1, R2 and R3, the local node L1 is encoded and the remote nodes R1, R2 and R3 may be encoded in the same or a different manner. Once all the links in the flooding topology are encoded, the encoded links can be flooded to every node in the network. After receiving the encoded links, every node decodes the links and creates and/or updates the flooding topology.

Node Representation: Node Index

Every node after encoding orders each of the nodes in the network by their node ID (e.g., router IDs in OSPF, system IDs in IS-IS) in ascending order, and generates the same sequence of the nodes in the area. The sequence of nodes have an index 0, 1, 2, and so on respectively such that each node in the encoded links is represented by its index. More specifically, for every node in a network or area, an index is used to represent it. For example, for the nodes L1, R1, R2, R3, R21, R22, R31, R32, R11, and R111 in FIG. 2, an index 0, 1, 2, 3, 4, 5, 6, 7, 8 and 9 is used to represent the nodes, respectively.

Figure 3:
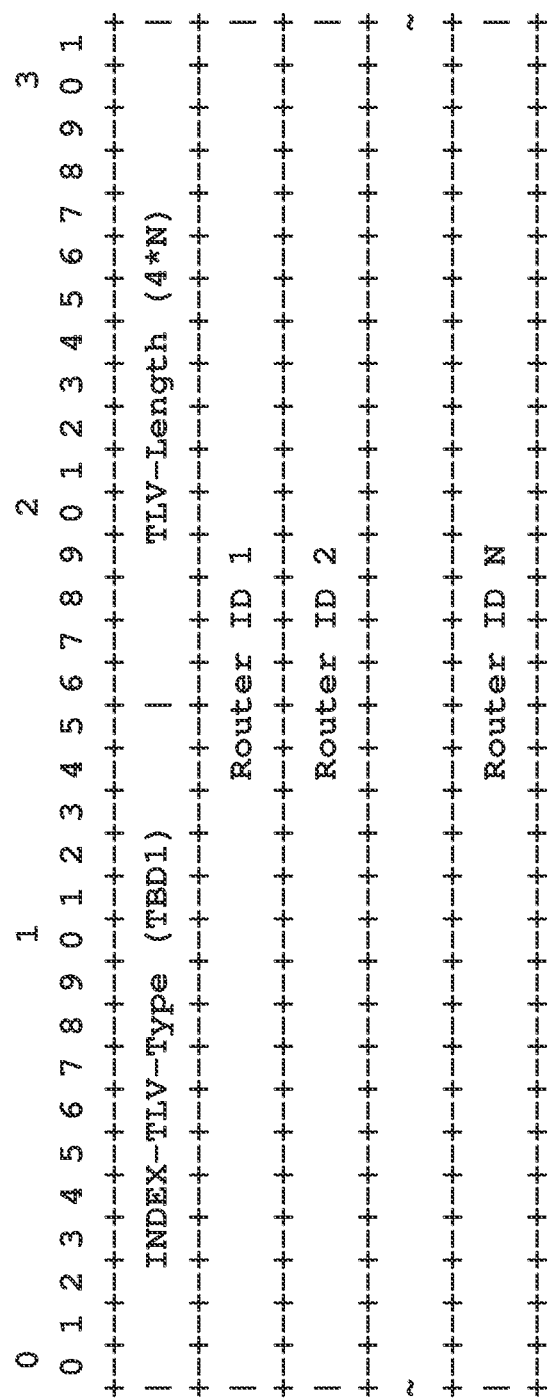
FIG. 3 shows an example node index type length value (TLV) packet.

In one embodiment, with reference to FIG. 3 which shows a node index type length value, an OSPF Router Information (RI) Link state Advertisement (LSA) containing a Type-Length-Value (TLV) with a sequence of router identifiers (IDs) that represents the indexes of the nodes. For example, a Node Index TLV is defined as follows. The Node Index TLV contains N router IDs in order: Router ID 1, Router ID 2, ..., Router ID N. This represents that the indexes of Router ID 1, Router ID 2, ..., and Router ID N are 0, 1, ..., and N−1, respectively. This RI LSA is then generated by a leader in an area and distributed to every other node in the area.

In another embodiment, each node in an area may order the nodes based on a rule, which generates the same sequence of the nodes on each node in the area. For example, a rule may be to define the nodes by the sequence having the index 0, 1, 2, and so on respectively. For example, every node orders the nodes by their router IDs in ascending order.

Local Node Representation

Figures 4A, 4B:
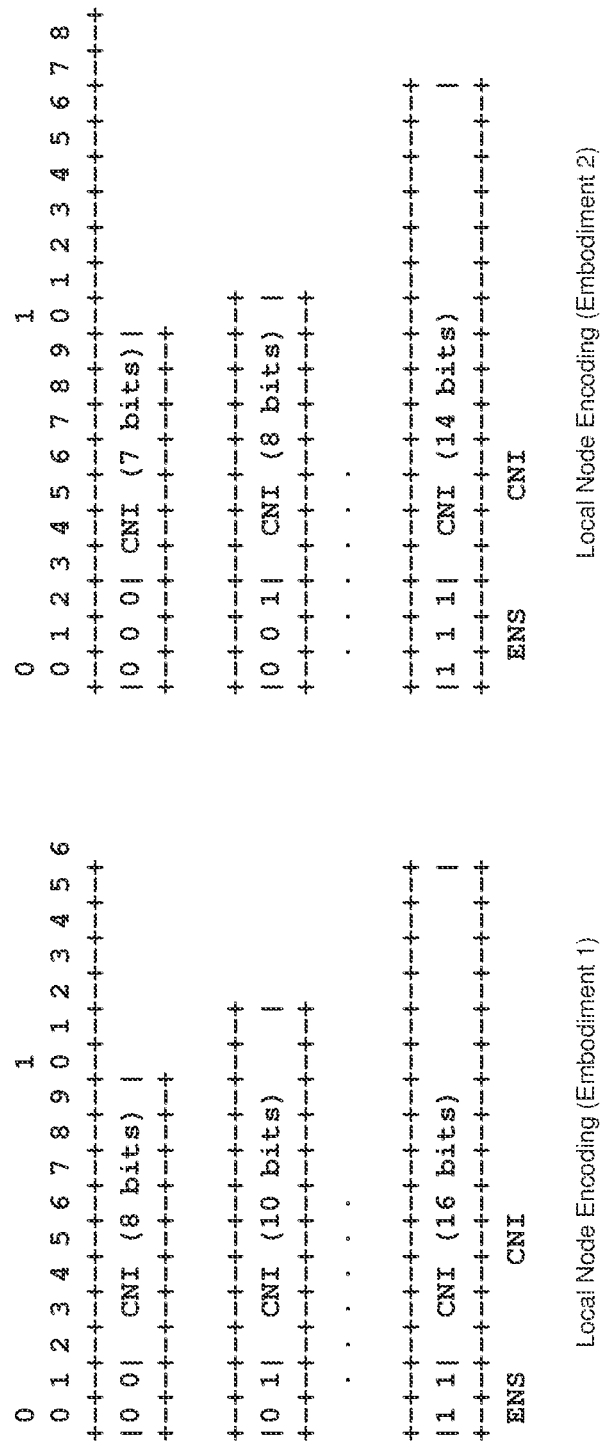

FIGS. 4A-4C illustrate example embodiments of local node encoding in a network. For the links between a local node (L) and multiple remote nodes (R), e.g., the three links between local node L1 and remote nodes R1, R2 and R3 (FIG. 2), the local node L1 can be encoded using two parts: encoded node index size (ENS) and compact node index (CNI). ENS may have a number of values (e.g., values 0, 1, 2, and 3), each of which indicates a size of a compact node index. With reference to FIG. 4A, and in one embodiment (embodiment 1), value 0 indicates that the size of CNI is 8 bits, value 1 indicates that the size of CNI is 10 bits, value 2 indicates that the size of CNI is 12 bits, value 3 indicates that the size of CNI is 16 bits. Thus, in the example, local node L1 is encoded as ENS=0 using 2 bits and CNI=0 using 8 bits. Node L1 is encoded in 10 bits in total.

Turning to FIG. 4B, and in a second embodiment (embodiment 2), the value of ENS plus a constant such as 7 is the size of CNI. For example, value 0 of ENS indicates that the size of CNI is 7 bits (i.e., 0+7=7), value 1 of ENS indicates that the size of CNI is 8 bits (i.e., 1+7=8), value 2 of ENS indicates that the size of CNI is 9 bits (i.e., 2+7=9), value 3 of ENS indicates that the size of CNI is 10 bits (i.e., 3+7=10), and so on. Thus, in the example, local node L1 is encoded as ENS=0 using 3 bits and CNI=0 using 7 bits. Node L1 is encoded in 10 bits in total.

In a third embodiment (embodiment 3), as shown in FIG. 4C, the value of ENS directly indicates the size of CNI in bits. That is, the value of ENS is the size of CNI in bits. For example, ENS is represented in 4 bits. The value of ENS is from 0 to 15. If the value of ENS is 15, then it indicates that the size of CNI is 15 bits. If the value of ENS is 10, then it indicates that the size of CNI is 10 bits.

Remote Node Representation

FIGS. 5A and 5B illustrate example embodiments of remote node encoding in a network. For the links between a local node (L) and multiple remote nodes (R), e.g., the three links between local node L1 and remote nodes R1, R2 and R3 (FIG. 2), the remote nodes (e.g., encode node R1, R2 and R3) can be encoded using three parts: Number of Nodes (NN), encoded node index sizes (ENS), and compact node indexes (CNIs). For remote node encoding, NN indicates the number of nodes of the CNI size. The corresponding CNIs follow these NNs. the ENS may be the same as the local node described above. That is, the ENS may have a number of values (e.g., values 0, 1, 2, and 3), each of which indicates a size of a compact node index.

In a first embodiment, as illustrated in FIG. 5A, the value of NN is the number of the remote nodes. In another embodiment, the value of NN plus one is the number of the remote nodes. For example, we use 4 bits for a NN to represent a maximum number of 16 CNIs. NN=0 represents 1 CNI. NN=15 represents 16 CNIs.

In still one other embodiment, remote nodes are encoded using two parts: Number of Nodes (NN) and compact node indexes. The size of CNI for the remote nodes uses the ENS for the local node of a link. Suppose that the ENS indicates that the size of CNI is 8 bits. Three remote nodes R1, R2 and R3 are encoded below in 3 and half bytes.

Turning to FIG. 5B, and in a second embodiment, remote nodes are encoded using three parts: Number of Nodes (NN), ENS and compact node indexes. The value of ENS plus 7 is the size of CNI for remote nodes. In the example below, ENS is zero, the size of CNI for each of remote nodes following it is 7 bits (i.e., 0+7=7).

Links Representation

FIGS. 6A-6C illustrate example embodiments of a link encoding in a network. For links between a local node (L) and multiple remote nodes (R), e.g., the three links between local node L1 and remote nodes R1, R2 and R3 (FIG. 2), the local node (e.g., node L1) is encoded followed by encoding the remote nodes (e.g., nodes R1, R2 and R3). With reference to FIG. 6A, and in a one embodiment (embodiment 1), local node L1 is encoded as ENS=1 using 3 bits indicating the size of CNI is a value of ENS plus 7 and CNI=0 using 8 bits. Node L1 is encoded in eleven bits in total. Three remote nodes R1, R2 and R3 are encoded in two parts: the number of remote nodes (NN) and the CNIs for three remote nodes below in 3 bytes. Refer to the figure below. Three links are encoded in 4 bytes and 7 bits.

In another embodiment (embodiment 2), the local node L1 is encoded by ENS and CNI for L1, where the value of ENS plus 6 is the size of CNI for local node L1. For example, with reference to FIG. 6B, ENS=2 using 3 bits and CNI=0 using 8 bits. Local node L1 is encoded in eleven bits in total (i.e., the first 3 bits (bits 0, 1, 2) of row 1 and the first 8 bits (bits 0-7) of row 2). The remote nodes (R) are encoded in three parts: the number of remote nodes (NN), the encoded node index size indicator (ENS) and Compact Node Indexes (CNIs). The value of ENS for the remote nodes, when set to zero, indicates the size of remote nodes' CNI are 6 bits. Three links are encoded in 36 bits (i.e., 4 bytes and 4 bits, i.e., 4.5 bytes).

Turing to FIG. 6C, another embodiment (embodiment 3) is disclosed in which local node L1 is encoded by ENS and CNI for L1, where the value of ENS is the size of CNI for the local node L1. For example, ENS=2 using 4 bits (i.e., bits 0-3 in row 1) and CNI=0 using 2 bits (i.e., bits 0 and 1 of row 2). Node L1 is encoded with 6 bits in total. The remote nodes (R) are encoded in two parts: the number of remote nodes (NN) and Compact Node Indexes of remote nodes. The value of ENS for local node is the size of remote nodes' CNI, which is 2 bits. Thus, in this case, three links are encoded in 2 bytes (i.e., 16 bits).

Flooding Topology

FIGS. 7A-6C illustrates and example flooding topology type-length-value (TLV). For a flooding topology computed by a leader node of an area, the links on the flooding topology represent the topology as a whole. FIG. 7A shows a format of a TLV for the links encodings is included in an LSA to represent the flooding topology (FT). The format includes the flooding topology (FT) type and TLV length, along with the links encoding from each node to its remote nodes, as illustrated.

In one embodiment, with reference to FIG. 7B, an OSPF Router Information (RI) Link state Advertisement (LSA) containing a Type-Length-Value (TLV) with links encodings for each of the nodes in the area to its remote nodes is used to represent the flooding topology (FT) and flood the FT to every node in the area. For example, a flooding topology TLV is defined as follows: The TLV includes N links encodings: links encoding for the links between node 1 as a local node and its remote nodes, links encoding for the links between node 2 as a local node and its remote nodes, . . . , links encoding for the links between node N as a local node and its remote nodes.

In another embodiment, with reference to FIG. 7B, for OSPFv2, an Opaque LSA of a new opaque type (to be determined) contains a Flooding Topology Links TLV is used to flood the flooding topology from the leader of an area to all other nodes in the area. The Opaque LSA includes, for example, an LS age, with options and LS type, and defines the FT type, the instance ID, advertising router, LS sequence number, LS checksum and length and FT links TLV.

Figure 7C:
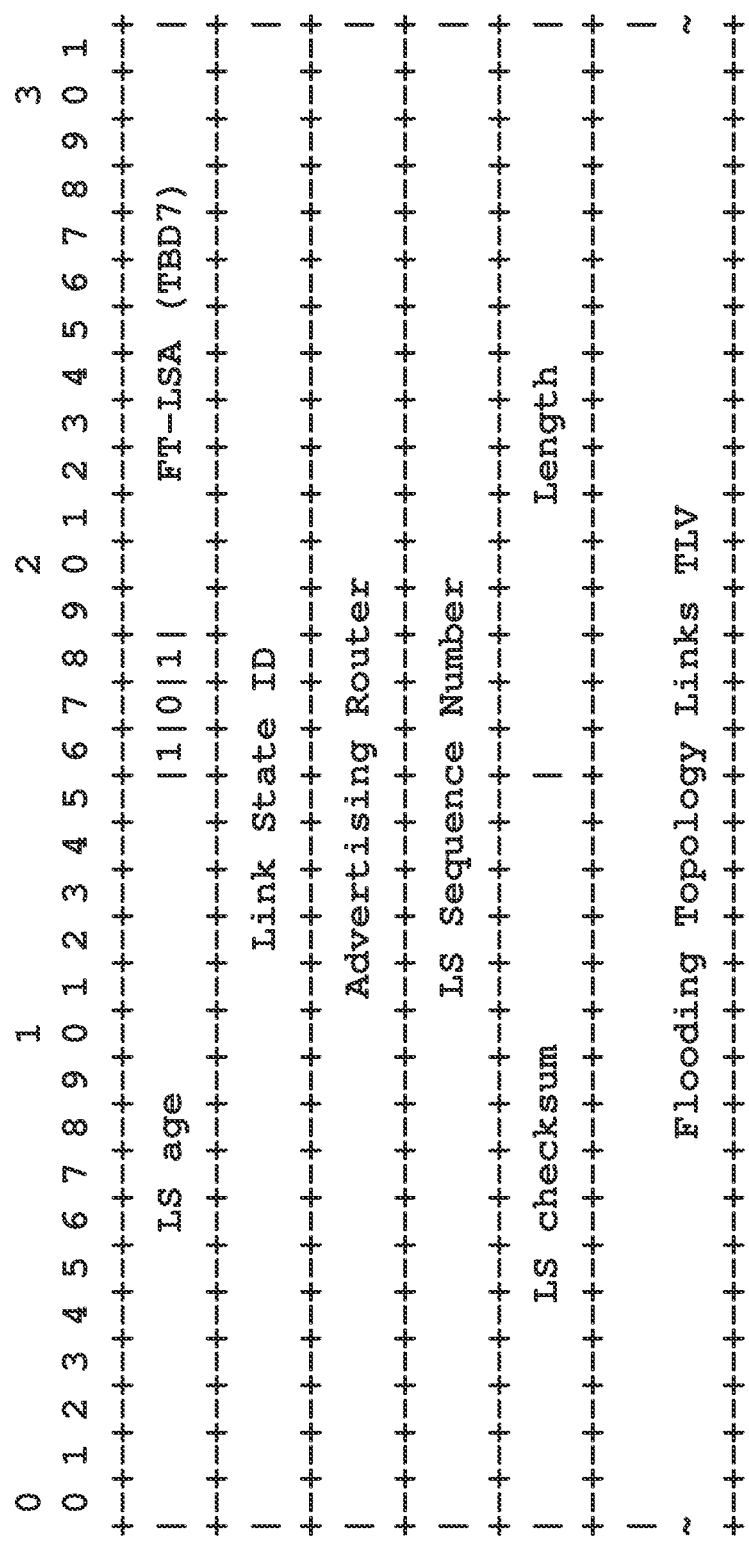

In still one other embodiment, with reference to FIG. 7C, for OSPFv3, an area scope LSA of a new LSA function code (to be determined) contains FT Links TLV used to flood the flooding topology from the leader of an area to all other nodes in the area. Otherwise, the FT LSA is similar to the LSA of FIG. 7B.

Link State Flooding

As noted above, current flooding topologies are inefficient and do not adjust for critical link failure and are not represented in current standards. This disclosure resolves these problems, and provides an efficient representation of flooding topology that reduces the size of the flooding topology to be flooded to each node. In one embodiment, the network is able to indicate the critical failure and ensure that the flooding topology is still distributed to each node in the case of the failure.

As defined in this disclosure: a critical link (or interface) on a flooding topology is an only link or interface among one or more of the nodes on the flooding topology. When this link or interface goes down, the flooding topology will be split; a critical node on a flooding topology is an only node connecting one or more of the nodes on the flooding topology. When this node goes down, the flooding topology will be split. A link (interface) can be determined during and/or after computing the flooding topology. For example, and with reference to FIG. 2, the links between R3 and R31 and R11 and R111 are defined as critical links, and nodes R3, R31, R11 and R111 are the critical nodes. If any of these nodes or links fail, a backup link will become necessary.

For a flooding topology (FT) computed by a leader of an area, critical links on the FT may be represented by encoding the links using a TLV format referred to herein as a critical links TLV. This critical links TLV, as shown in FIG. 8A, is defined as including a number of critical links encodings, each of which is similar to the links encoding for the links of FT. However, as the link is critical, it is the only link or interface among one or more of the nodes on the flooding topology, as described above.

In one embodiment, when a critical interface or node is down, traditional flooding techniques may be used before a flooding topology is constructed using the disclosed embodiments.

In another embodiment, when a critical interface or node is down, the backup links are used to flood the link states before a new flooding topology is constructed.

To avoid failure of critical links, a backup link or path may be generated. A backup path is a path or a sequence of links, providing an alternative connection between the two end nodes of a link on the flooding topology or between the two end nodes of a path crossing a node on the flooding topology. When a critical link fails, the backup path for the link provides a connection to connect two parts of a split flooding topology. When a critical node fails, the backup paths for the paths crossing the node connect the split parts of the flooding topology into one.

FIG. 8B illustrates an example backup link for a flooding topology. For a flooding topology computed by a leader of an area, backup links for a critical link on the flooding topology may be computed by the leader. When the critical link fails, a link state of the flooding topology can be distributed or flooding to each node in the area using the links on the flooding topology along with the backup links. These backup links are represented by encoding the links using a TLV format, referred to herein as a backup links TLV, as illustrated. The backup TLV is defined as including a number of backup links encodings, each of which is similar to the links encoding for the links of flooding topology.

In one embodiment, for a flooding topology computed by each node of an area, backup links for a critical link on the flooding topology may be computed by the node. When the critical link fails, a link state can be distributed or flooding to each node in the area using the backup links and the links on the flooding topology.

Block Links Representation

FIGS. 9A-9D illustrate example embodiments of block links encoding. Block encoding uses a single structure to encode a block (or part) of the topology, which can be a block of links in a flooding topology. In one embodiment, the block of links can be all of the links in the flooding topology. Encoding starts with a local node L and its adjacent (or remote) nodes RNi (i=1, 2, . . . , n), and can be considered as an extension to the links encoding. The encoding for the remote nodes is extended to include Extending Flags (E Flags) between the NN (Number of Nodes) field and the CNIs (Compact Node Indexes) for the remote nodes. The length of the E Flags field is NN bits, where the first bit (i.e., the most significant bit) in the E Flags field is for the first remote node (e.g., RN1), the second bit is for the second remote node (e.g., RN2), and so on. The E flag for a remote node RNi set to one indicates that the links attached to the remote node RNi are included below. The E flag for a remote node RNi set to zero means that no links attached to the remote node RNi are included below. The links attached to the remote node RNi are represented by the RNi as a local node and the remote nodes of RNi. The encoding for the remote nodes of RNi is the same as that for the remote nodes of a local node. That is, the encoding for RNi consists of an NN field of 4 bits, E Flags field of NN bits, and CNIs for the remote nodes of RNi.

Figure 9A:
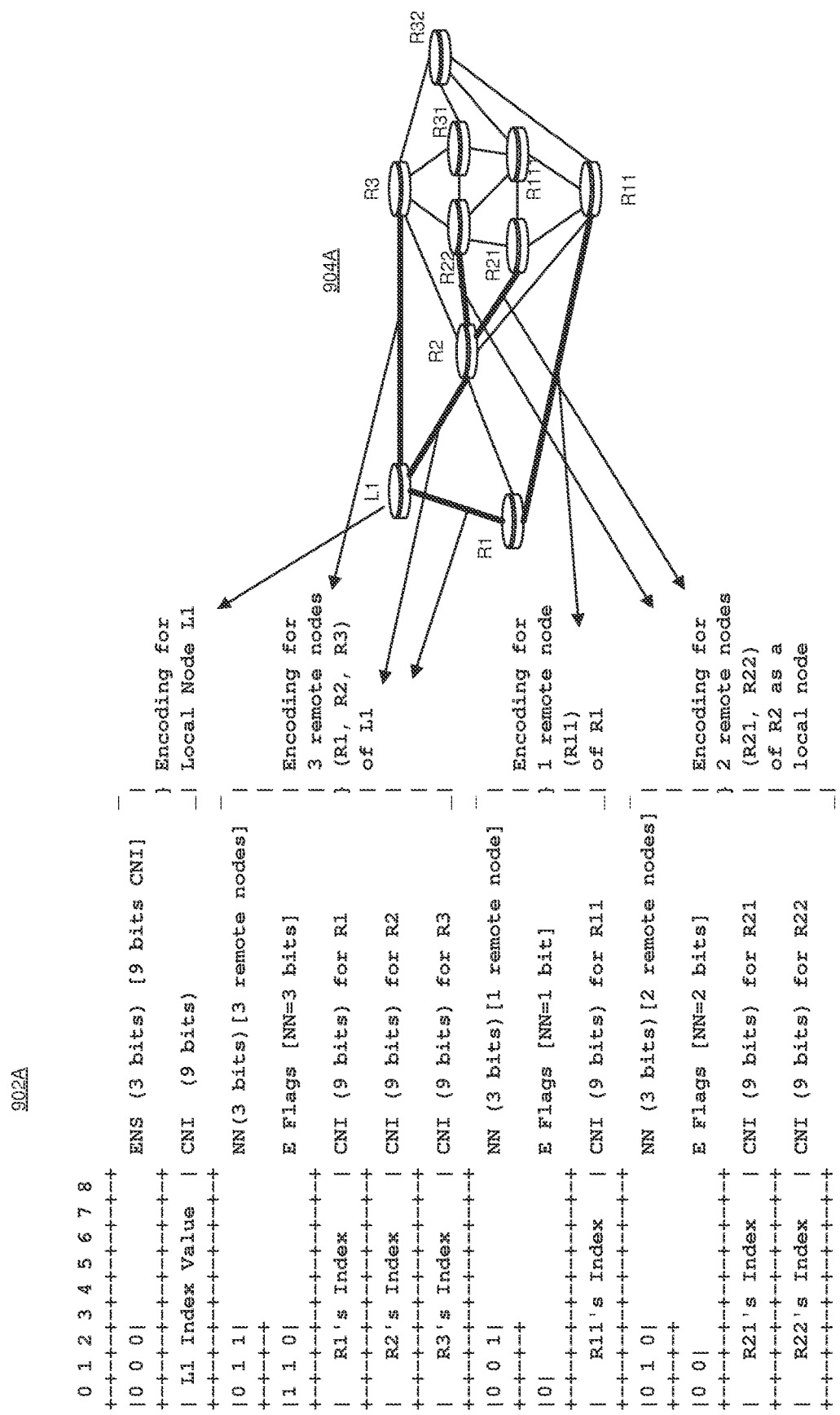

For example, with reference to FIG. 9A, the block of links starts with a local node L and its remote (or adjacent) nodes Ri (i=1, 2, . . . , n), which may be considered as an extension to the links encoding. The links attached to local node L and between local node L and its remote nodes Ri are represented by L and Ri, respectively. For each of Ri (i=1, 2, . . . , n), the links attached to Ri and between Ri and its remote nodes Rij (j=1, 2, . . . , m) are represented by Ri as a local node and Rij (j=1, 2, . . . , m). For each of Rij (j=1, 2, . . . , m), the links attached to Rij and between Rij and its remote nodes Rijk (k=1, 2, . . . , s) are represented by Rij as a local node and Rijk (k=1, 2, . . . , s), and so on. In one example, six (6) links in the flooding topology are encoded in a single structure, where the links (L1 to R1, L1 to R2, L1 to R3, R2 to R22 and L1 to R11) are represented by darkened lines in the flooding topology 904A and the single structure is represented as 902A.

In one embodiment, and as indicated above, encoding starts with the links between local node L1 and 3 remote nodes R1, R2 and R3 of the local node L1. The encoding for 3 remote nodes R1, R2 and R3 comprises an NN field of 3 bits with value of 3, E Flags field of NN=3 bits, and the indexes of remote nodes R1, R2 and R3.

In the depicted example, the first E flag (in this case, 3 bits) in the encoding for R1, R2 and R3 is set to one, indicating that the links between the first remote node R1 (as a local node) and its remote nodes are included. In this example, 1 link between R1 and its remote node R11 is represented by the encoding for the remote node R11 of R1 as a local node. The encoding for a single remote node R11 consists of an NN field of 3 bits with a value of 1, E Flags field of NN=1 bits, and the index of remote node R11. The size of the index of R11 is the same as that of local node L1, indicated by the ENS in the encoding for L1.

The second E flag in the encoding for R1, R2 and R3 is set to one, indicating that the links between R2 as a local node and its remote nodes are included. In this example, 2 links between R2 and its 2 remote nodes R21 and R22 are represented by the encoding for the remote nodes R21 and R22 of R2 as a local node. The encoding for 2 remote nodes R21 and R22 consists of an NN field of 3 bits with a value of 2, E Flags field of NN=2 bits, and the indexes of R21 and R22. The size of the index of R21 and R22 is the same as that of local node L1, indicated by the ENS in the encoding for L1.

The third E flag in the encoding for remote nodes R1, R2 and R3 is set to zero, which indicates that no links between the third remote node R3 as a local node and its remote nodes are included.

The E flag in the encoding for remote node R11 is set to zero, which indicates that no links between the remote node R11 as a local node and its remote nodes are included.

The first E flag in the encoding for remote nodes R21 and R22 is set to zero, which indicates that no links between the first remote node R21 as a local node and its remote nodes are included, and the second E flag in the encoding for remote nodes R21 and R22 is set to zero, which indicates that no links between the second remote node R22 as a local node and its remote nodes are included.

In fact, the first two E flags (i.e., the third E flag in the encoding for remote nodes R1, R2 and R3, and the E flag in the encoding for remote node R11) can be set to one, and the corresponding links can be included in the same single structure.

Figure 9B:
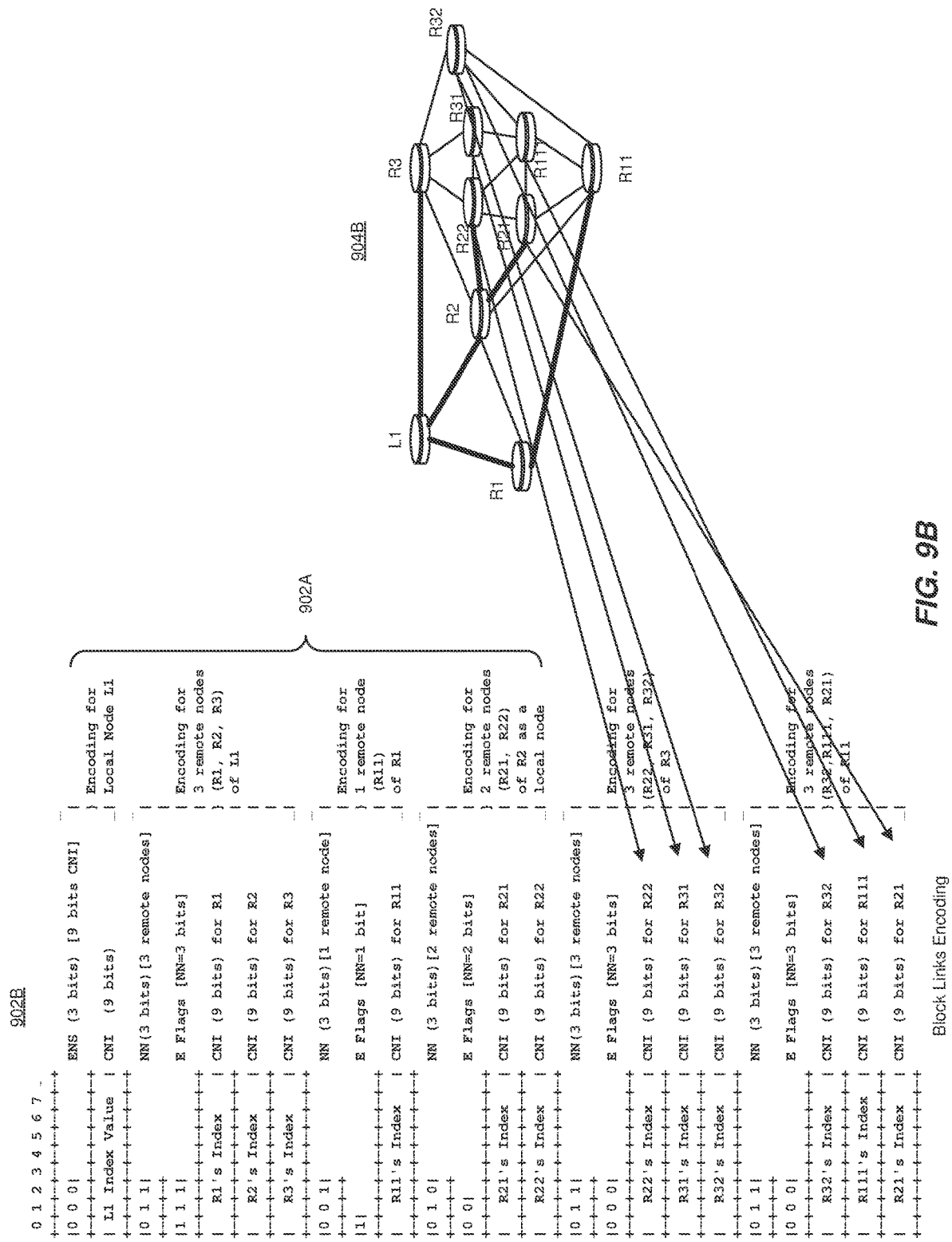

Turning to FIG. 9B, another example with all 12 links in the flooding topology 904B are represented in a single structure 902B. As illustrated, single structure 902B includes single structure 902A (FIG. 9A) and non-critical links which comprise the remainder of single structure 902B, explained below. However, in this example, the third E flag in the encoding for remote nodes R1, R2 and R3 is set to one, which indicates that the links between the third remote node R3 as a local node and its remote nodes (R22, R31 and R32) are included. Thus, in the example, 3 links between R3 and its 3 remote nodes R22, R31 and R32 are represented by the encoding for the remote nodes R22, R31 and R32 of R3 as a local node. The encoding for 3 remote nodes R22, R31 and R32 consists of an NN field of 3 bits with value of 3, E Flags field of NN=3 bits, and the indexes of R22, R31 and R32. The size of the index of R22, R31 and R32 is the same as that of local node L1 indicated by the ENSI in the encoding for L.

The E flag in the encoding for remote node R11 is set to one, which indicates that the links between the remote node R11 as a local node and its remote nodes (R32, R111 and R21) are included.

In this example, 3 links between R11 and its 3 remote nodes R32, R111 and R21 are represented by the encoding for the remote nodes R32, R111 and R21 of R11 as a local node. The encoding for 3 remote nodes R32, R111 and R21 consists of an NN field of 3 bits with value of 3, E Flags field of NN=3 bits, and the indexes of R32, R111 and R21. The size of the index of R32, R111 and R21 is the same as that of local node L1 indicated by the ENSI in the encoding for L1.

In another embodiment, the encoding of the remote nodes may be ordered according to differing representations. In a first representation, as illustrated in FIG. 9C, the remote nodes may be ordered by the number of hops from the local node to the remote nodes. In this way, the nodes are traversed and the corresponding links are encoded along the flooding topology through a breadth-first search.

Another representation includes using a depth-first encoding, as illustrated in FIG. 9O, in which the nodes are traversed and the corresponding links are encoded along the flooding topology through a depth-first search. For example, encoding starts with encoding local node L1 and encoding L1's remote nodes R1, R2 and R3. Subsequently, R1's remote node, R11 is encoded (note, R1 is as a local node for R11). Along node R11 as a local node, its remote nodes R32, R111 and R21 are encoded, R32's remote node R3 is encoded, R3's remote nodes R22 and R31 are encoded, R22's remote node R2 is encoded, and R2's remote node R21 is encoded.

Figure 10A:
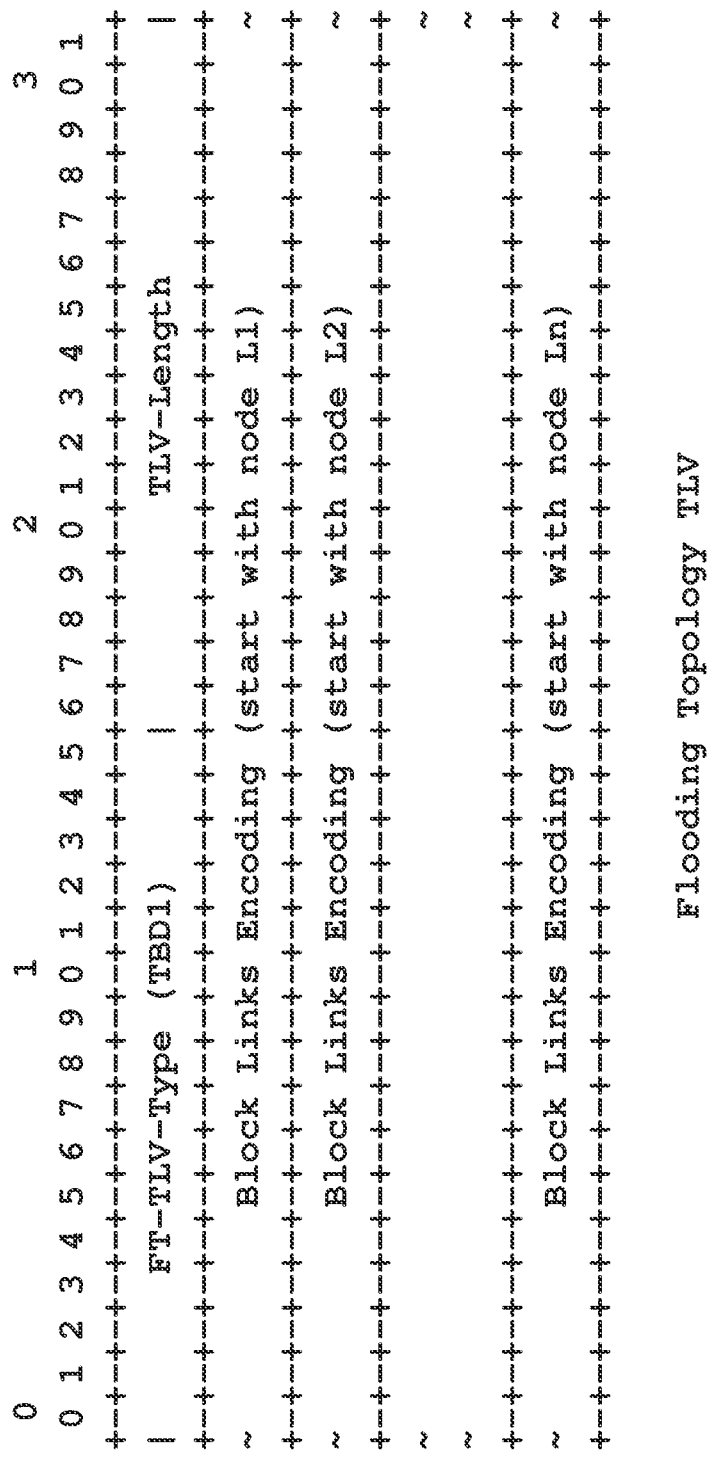
FIGS. 10A-10B illustrate example formats for block encoding.
Figure 10B:
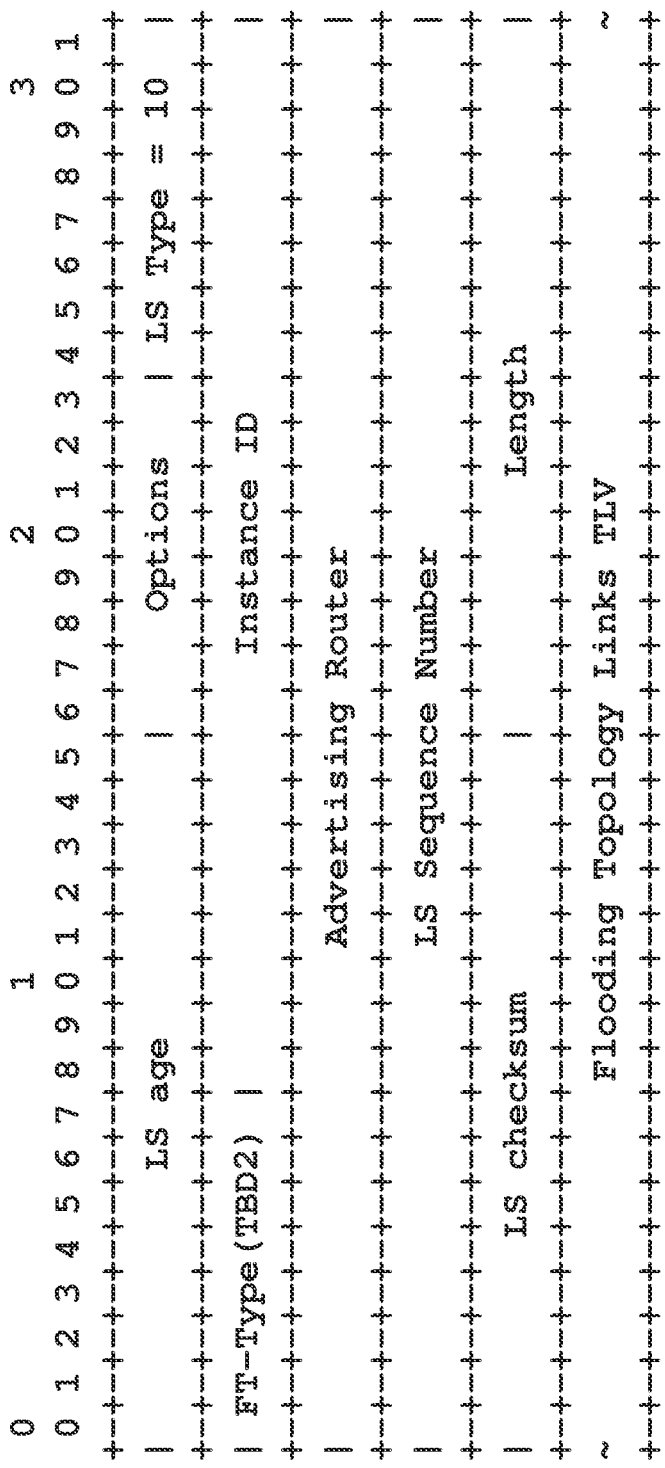

FIGS. 10A and 10B illustrate example formats for block encoding. For a flooding topology computed by a leader of an area, it may be represented by all the links on the flooding topology. In one embodiment, for OSPFv2, an Opaque LSA of a new opaque type (TBD2) containing a Flooding Topology Links TLV is used to flood the flooding topology from the leader of an area to all the other nodes in the area. The Type-Length-Value (TLV) contains all the links in the flooding topology (FT), which is called a flooding topology TLV and is depicted in FIG. 10A. In one embodiment, the FT TLV contains one or more (such as n) block links encodings.

For OSPFv2, an Opaque LSA of a new opaque type (TBD2) containing a Flooding Topology Links TLV is used to flood the flooding topology from the leader of an area to all the other nodes in the area. A flooding topology opaque LSA is depicted in FIG. 10B, and is one of the fields of the flooding topology opaque LSA shown in FIG. 7B.

The present disclosure proposes a solution for encoding a flooding topology in much more efficient way, which significantly reduces the size of the flooding topology to be flooded to every node in an area. Thus, the present disclosure ensures continuous service to customers. The present disclosure can be deployed in any router and switch, which are used by the service providers around the world.

Figure 11:
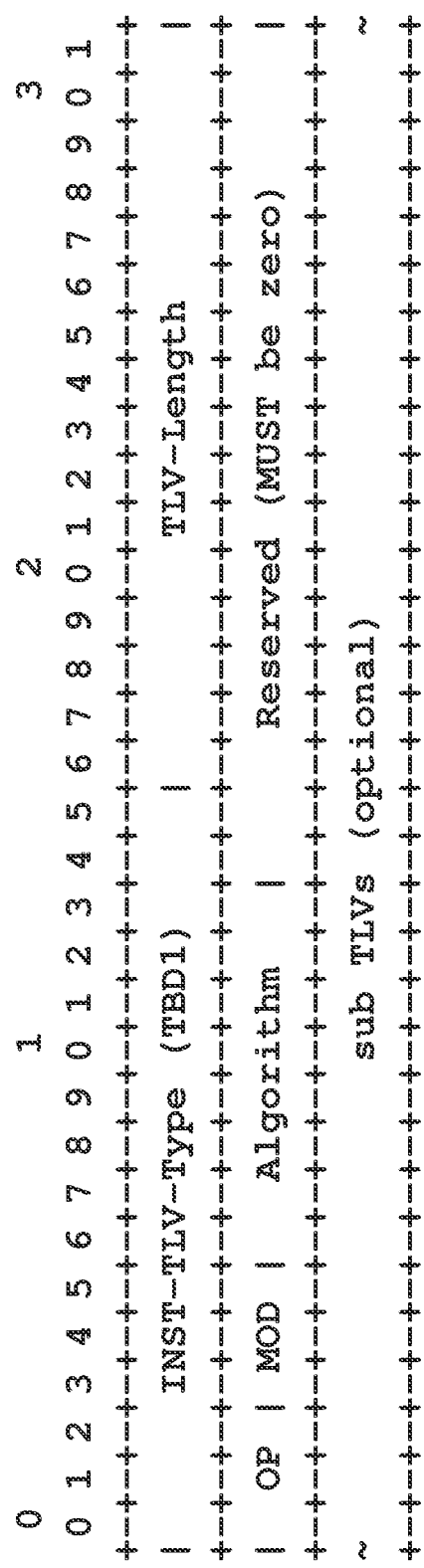
FIG. 11 shows an example of a flooding reduction instruction.

FIG. 11 shows an example of a flooding reduction instruction. The flooding reduction instruction TLV in RI LSA is defined in OSPF RI LSA [RFC770], and is incorporated by reference in its entirety herein. The TLV includes instructions about flooding reduction and originates from one node with the format shown in the figure.

In addition to the description above with reference to FIG. 2, the OP field of three bits is defined and may have a value of: 0x001 (R), stands for performing flooding reduction, which instructs the nodes area to perform flooding reduction; 0x010 (N), stands for rolling back to normal flooding, which instructs the nodes in an area to roll back to perform normal flooding. Any other value is ignored.

A MOD field of three bits is defined in the TLV and may have a value of: 0x001 (C): stands for centralized Mode, which instructs: 1) the nodes in an area to select leaders (primary/designated leader, secondary/backup leader, and so on), 2) the primary leader to compute a flooding topology and flood it to all the other nodes in the area, 3) every node in the area to receive and use the flooding topology originated by the primary leader; 0x010 (D): stands for distributed mode, which instructs every node in an area to compute and use its own flooding topology; and 0x011 (S): stands for static mode, which instructs every node in an area to use the flooding topology statically configured on the node. When any of the other values is received, it is ignored.

An Algorithm field of eight bits is defined in the TLV to instruct the leader node in centralized mode or every node in distributed mode to use the algorithm indicated in this field for computing a flooding topology.

The format may also include an optional sub TLVs.

FIG. 12 illustrates an example flow diagram for computing a path in a network. In embodiments, the flow diagram may be computer-implemented methods performed, at least partly, by hardware and/or software components illustrated in the various figures and as described herein. In one embodiment, the disclosed process may be performed by the nodes disclosed in FIGS. 1 and 12. In one embodiment, software components executed by one or more processors, such processor 1320 or 1402, performs at least a portion of the process.

The process begins at step 1202, where a node in the network, such as a leader node or a local node, receives connectivity information of the nodes in the network. At step 1204, a processor(s) at the node computes a flooding topology based on the received connectivity information, where the flooding topology is represented by links between the nodes in the network. The links are encoded at step 1206 between the nodes on the flooding topology, and a link state advertisement/message is flooded to the nodes in the network step 1208, where the link state advertisement/message includes each of the encoded links in the flooded topology.

Figure 13:
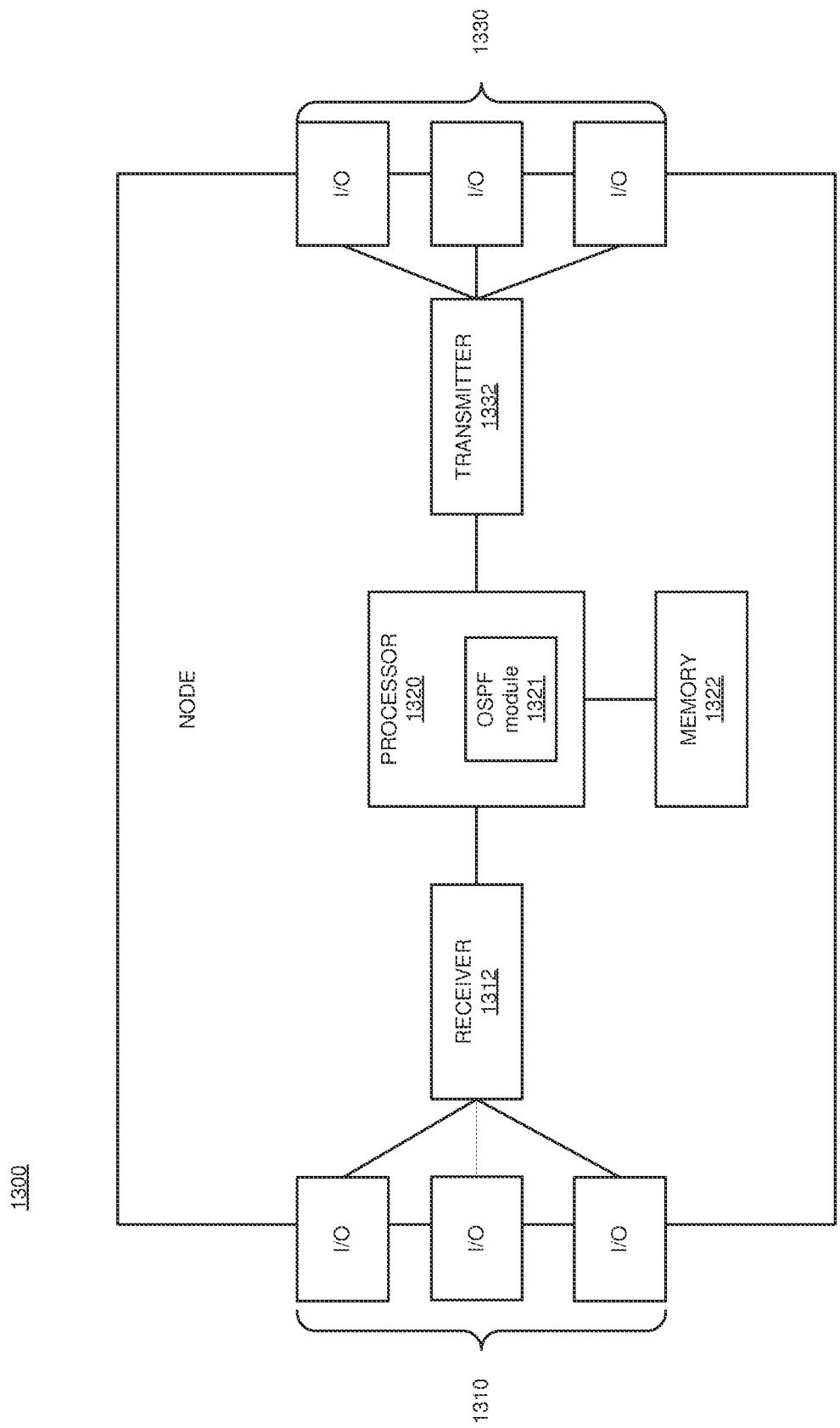
FIG. 13 illustrates an embodiment of a router.

FIG. 13 illustrates an embodiment of a router. The node (e.g., a router) 1300 may be any node or router as described, for example, in FIGS. 1 and 2. The node 1300 may comprise a plurality of input/output ports 1310/1330 and/or receivers (Rx) 1312 and transmitters (Tx) 1332 for receiving and transmitting data from other nodes, a processor 1320 to process data and determine which node to send the data to and a memory. The node 1300 may also generate and distribute LSAs to describe and flood the various topologies and/or area of a network. Although illustrated as a single processor, the processor 1320 is not so limited and may comprise multiple processors. The processor 1320 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. Moreover, the processor 1320 may be implemented using hardware, software, or both. The processor 1320 includes a OSPF module 1321, which implements the disclosed embodiments. The inclusion of the OSPF module 1321 therefore provides a substantial improvement to the functionality of the network device 1300 and effects a transformation of the node 1300 to a different state. Alternatively, the memory 1322 stores the OSPF module 1321 as instructions, and the processor 1320 executes those instructions.

The memory 1322 may be configured to store reference structures, such as single structure 902A and 902B and network topologies, such as 904A and 904B. Although illustrated as a single memory, memory 1322 may be implemented as a combination of read only memory (ROM), random access memory (RAM), or secondary storage (e.g., one or more disk drives or tape drives used for non-volatile storage of data).

The schemes described above may be implemented on any general-purpose network component, such as a computer or network component with sufficient processing power, memory resources, and network throughput capability to handle the necessary workload placed upon it.

Figure 14:
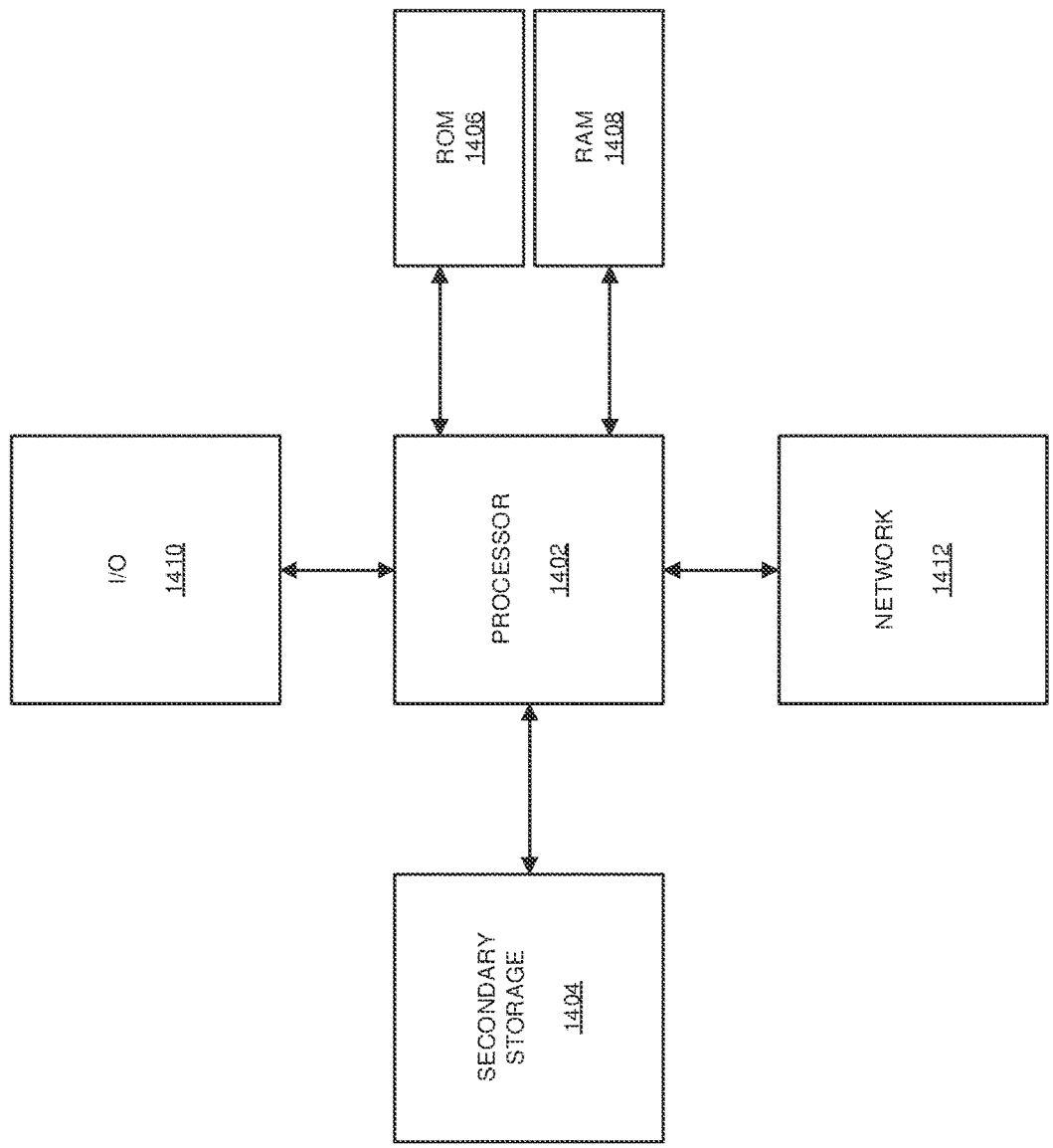
FIG. 14 illustrates a schematic diagram of a general-purpose network component or computer system.

FIG. 14 illustrates a schematic diagram of a general-purpose network component or computer system. The general-purpose network component or computer system 1400 includes a processor 1402 (which may be referred to as a central processor unit or CPU) that is in communication with memory devices including secondary storage 1404, and memory, such as ROM 1406 and RAM 1408, input/output (I/O) devices 1410, and a network 1412, such as the Internet or any other well-known type of network, that may include network connectively devices, such as a network interface. Although illustrated as a single processor, the processor 1402 is not so limited and may comprise multiple processors. The processor 1402 may be implemented as one or more CPU chips, cores (e.g., a multi-core processor), FPGAs, ASICs, and/or DSPs, and/or may be part of one or more ASICs. The processor 1402 may be configured to implement any of the schemes described herein. The processor 1402 may be implemented using hardware, software, or both.

The secondary storage 1404 is typically comprised of one or more disk drives or tape drives and is used for non-volatile storage of data and as an over-flow data storage device if the RAM 1408 is not large enough to hold all working data. The secondary storage 1404 may be used to store programs that are loaded into the RAM 1408 when such programs are selected for execution. The ROM 1406 is used to store instructions and perhaps data that are read during program execution. The ROM 1406 is a non-volatile memory device that typically has a small memory capacity relative to the larger memory capacity of the secondary storage 1404. The RAM 1408 is used to store volatile data and perhaps to store instructions. Access to both the ROM 1406 and the RAM 1408 is typically faster than to the secondary storage 1404. At least one of the secondary storage 1404 or RAM 1408 may be configured to store routing tables, forwarding tables, or other tables or information disclosed herein.

It is understood that by programming and/or loading executable instructions onto the node 1300, at least one of the processor 1420 or the memory 1422 are changed, transforming the node 1300 in part into a particular machine or apparatus, e.g., a router, having the novel functionality taught by the present disclosure. Similarly, it is understood that by programming and/or loading executable instructions onto the node 1300, at least one of the processor 1402, the ROM 1406, and the RAM 1408 are changed, transforming the node 1300 in part into a particular machine or apparatus, e.g., a router, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hard-wires the instructions of the software. In the same manner as a machine controlled by a new ASIC is a particular machine or apparatus, likewise a computer that has been programmed and/or loaded with executable instructions may be viewed as a particular machine or apparatus.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network with one or more nodes, comprising:
   a first node including a processor, a receiver and a transmitter configured to:
      receive connectivity information of one or more nodes in the network including the first node;
      compute a flooding topology based on the received connectivity information, the flooding topology represented by links between the one or more nodes, including the first node, in the network;
      encode the links between the one or more nodes, including the first node, on the flooding topology, wherein the links are encoded with at least an encoded node index size (ENS) index and a compact node index (CNI);
      flooding a link state advertisement message to the one or more nodes in the network, the link state advertisement message including each of the encoded links in the flooding topology;
   a second node including a processor, a receiver and a transmitter to:
      receive the link state advertisement message including the encoded links in the flooding topology; and
      decode the encoded links in the link state advertisement message to obtain the flooding topology.

2. A computer-implemented method for path computation and setup of one or more nodes in a network, comprising:
   receiving, at a receiver of a first node, connectivity information of one or more nodes in the network including the first node;
   computing, by a processor of the first node, a flooding topology based on the received connectivity information, the flooding topology represented by links between the one or more nodes, including the first node, in the network;
   encoding the links, by the processor at the first node, between the one or more nodes, including the first node, on the flooding topology, wherein the links are encoded with at least an encoded node index size (ENS) index and a compact node index (CNI); and flooding, by a transmitter of the first node, a link state advertisement message to the one or more nodes in the network, the link state advertisement message including each of the encoded links in the flooding topology.

3. The computer-implemented method of claim 2, wherein the one or more nodes in the network is represented by a router information link state advertisement message that includes a type-length-value with a sequence of router identifiers that represents an index for each of the one or more nodes.

4. The computer-implemented method of claim 2, wherein the ENS includes one or more values indicating a size of the CNI.

5. The computer-implemented method of claim 4, wherein a second node of the one or more nodes in the network is encoded with a number of nodes (NN), the ENS and the CNI, where the NN indicates a number of nodes of the size of the CNI.

6. The computer-implemented method of claim 2, wherein the links between the first node and the one or more nodes in the network are encoded as a sequence of nodes beginning with the first node followed by each of the one or more nodes connected by the links to the first node.

7. The computer-implemented method of claim 2, further comprising:
computing a critical node in the flooding topology, where failure of the critical node results in the flooding topology being split;
determining one or more critical links in the flooding topology between the critical node and the one or more nodes in the network, where failure of the one or more critical links results in the flooding topology being split; and
encoding the one or more critical links in the flooding topology between the critical node and the one or more nodes in the network as a sequence of nodes beginning with the critical node followed by each of the one or more nodes connected by the one or more critical links to the critical node.

8. The computer-implemented method of claim 7, further comprising:
computing an alternative connection between two end nodes of the one or more nodes of the link on the flooding topology or a path crossing one of the one or more nodes on the flooding topology;
distributing a second link state advertisement message, including the alternative connection, to the two end nodes to connect the split flooding topology when the one or more critical links fail; and
distributing the second link state advertisement message, including the path crossing the one of the one or more nodes, to connect the split flooding topology when the critical node fails.

9. A non-transitory computer-readable medium storing computer instructions for path computation and setup in a network, that when executed by one or more processors, cause the one or more processors to perform the steps of:
receiving, at a receiver of a first node, connectivity information of one or more nodes in the network including the first node;
computing, by a processor of the first node, a flooding topology based on the received connectivity information, the flooding topology represented by links between the one or more nodes, including the first node, in the network;
encoding the links, by the processor at the first node, between the one or more nodes, including the first node, on the flooding topology, wherein the links are encoded with at least an encoded node index size (ENS) index and a compact node index (CNI); and
flooding, by a transmitter of the first node, a link state advertisement message to the one or more nodes in the network, the link state advertisement message including each of the encoded links in the flooding topology.

10. The non-transitory computer-readable medium of claim 9, wherein the one or more nodes in the network is represented by a router information link state advertisement message that includes a type-length-value with a sequence of router identifiers that represents an index for each of the one or more nodes.

11. The non-transitory computer-readable medium of claim 9, wherein where the ENS includes one or more values indicating a size of the CNI.

12. The non-transitory computer-readable medium of claim 11, wherein a second node of the one or more nodes in the network is encoded with a number of nodes (NN), the ENS and the CNI, where the NN indicates a number of nodes of the size of the CNI.

13. The non-transitory computer-readable medium of claim 9, wherein the links between the first node and the one or more nodes in the network are encoded as a sequence of nodes beginning with the first node followed by each of the one or more nodes connected by the links to the first node.

14. The non-transitory computer-readable medium of claim 9, further causing the one or more processors to perform the steps of:
computing a critical node in the flooding topology, where failure of the critical node results in the flooding topology being split;
determining one or more critical links in the flooding topology between the critical node and the one or more nodes in the network, where failure of the one or more critical links results in the flooding topology being split; and
encoding the one or more critical links in the flooding topology between the critical node and the one or more nodes in the network as a sequence of nodes beginning with the critical node followed by each of the one or more nodes connected by the one or more critical links to the critical node.

15. A device for path computation and setup in a network, comprising:
a non-transitory memory storage comprising instructions; and
one or more processors in communication with the memory, wherein the one or more processors execute the instructions to:
receive connectivity information of one or more nodes in the network including a first node;
compute a flooding topology based on the received connectivity information, the flooding topology represented by links between the one or more nodes, including the first node, in the network;
encode the links between the one or more nodes, including the first node, on the flooding topology, wherein the links are encoded with at least an encoded node index size (ENS) index and a compact node index (CNI); and flood a link state advertisement message to the one or more nodes in the network, the link state advertisement message including each of the encoded links in the flooding topology.

16. The device of claim 15, wherein the one or more nodes in the network is represented by a router information link state advertisement message that includes a type-length-value with a sequence of router identifiers that represents an index for each of the one or more nodes.

17. The device of claim 15, wherein the first node is encoded with an encoded node index size (ENS) index and a compact node index (CNI), where the ENS includes one or more values indicating a size of the CNI.

18. The device of claim 17, wherein a second node of the one or more nodes in the network is encoded with a number of nodes (NN), the ENS and the CNI, where the NN indicates a number of nodes of the size of the CNI.

19. The device of claim 15, wherein the links between the first node and the one or more nodes in the network are encoded as a sequence of nodes beginning with the first node followed by each of the one or more nodes connected by the links to the first node.

20. The device of claim 15, wherein the one or more processors further executing the instructions to:
compute a critical node in the flooding topology, where failure of the critical node results in the flooding topology being split;
determine one or more critical links in the flooding topology between the critical node and the one or more nodes in the network, where failure of the one or more critical links results in the flooding topology being split; and
encode the one or more critical links in the flooding topology between the critical node and the one or more nodes in the network as a sequence of nodes beginning with the critical node followed by each of the one or more nodes connected by the one or more critical links to the critical node.

21. The device of claim 20, wherein the one or more processors further executing the instructions to:
compute an alternative connection between two end nodes of the one or more nodes of the link on the flooding topology or a path crossing one of the one or more nodes on the flooding topology; and
distribute a second link state advertisement message, including the alternative connection, to the two end nodes to connect the split flooding topology when the one or more critical links fail; and
distribute the second link state advertisement message, including the path crossing the one of the one or more nodes, to connect the split flooding topology when the critical node fails.

* * * * *

UNITED STATES PATENT AND TRADEMARK OFFICE
CERTIFICATE OF CORRECTION

| | | |
|---|---|---|
| PATENT NO. | : 11,924,042 B2 | Page 1 of 1 |
| APPLICATION NO. | : 17/172725 | |
| DATED | : March 5, 2024 | |
| INVENTOR(S) | : Huaimo Chen | |

It is certified that error appears in the above-identified patent and that said Letters Patent is hereby corrected as shown below:

In the Claims

Column 18, Line 21 (Claim 11, Line 2): please replace "wherein where the" with --wherein the--

Signed and Sealed this
Sixth Day of August, 2024

Katherine Kelly Vidal
*Director of the United States Patent and Trademark Office*